(12) United States Patent
Kanazawa et al.

(10) Patent No.: US 8,825,213 B2
(45) Date of Patent: Sep. 2, 2014

(54) GAIT GENERATING DEVICE FOR LEGGED MOBILE ROBOT AND OPERATIONAL TARGET GENERATING DEVICE FOR ROBOT

(71) Applicant: Honda Motor Co., Ltd., Tokyo (JP)

(72) Inventors: Masao Kanazawa, Saitama (JP); Shigeru Kanzaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 327 days.

(21) Appl. No.: 13/687,151

(22) Filed: Nov. 28, 2012

(65) Prior Publication Data

US 2013/0144441 A1 Jun. 6, 2013

(30) Foreign Application Priority Data

Dec. 2, 2011 (JP) ................................. 2011-265276

(51) Int. Cl.
*B25J 9/16* (2006.01)
*B62D 57/032* (2006.01)

(52) U.S. Cl.
CPC .............. *B25J 9/1607* (2013.01); *B62D 57/032* (2013.01); *Y10S 901/01* (2013.01)
USPC ............................................. 700/263; 901/1

(58) Field of Classification Search
CPC ...... G06N 3/008; B62D 57/032; B25J 9/1607
USPC .......................................................... 700/263
See application file for complete search history.

(56) References Cited

U.S. PATENT DOCUMENTS 5,294,873 A * 3/1994 Seraji .......................... 318/568.1
5,430,643 A * 7/1995 Seraji ............................. 700/263

(Continued)

FOREIGN PATENT DOCUMENTS

| JP | 2004-306231 | 11/2004 |
| JP | 2011-183527 | 9/2011 |
| WO | 2008/105506 | 9/2008 |

OTHER PUBLICATIONS

"Resolved Momentum Control: Motion Generation of a Humanoid Robot based on the Linear and Angular Momenta", Shuuji Kajita et al., Journal of Robotics Society of Japan, vol. 22, No. 6, pp. 772-779, 2004, Discussed on p. 1 of specification, English abstract included.

(Continued)

*Primary Examiner* — Khoi Tran
*Assistant Examiner* — Ryan Rink
(74) *Attorney, Agent, or Firm* — Rankin, Hill & Clark LLP

(57) ABSTRACT

A gait generating device 32 includes a desired particular-site motion velocity value determining unit 45 that uses a quadratic evaluation function having a particular-site motion velocity vector ↑Vb as a variable and a linear matrix inequality having ↑Vb as a variable to sequentially determine, as a desired value ↑Vb_cmd2 of ↑Vb, a value of ↑Vb that can minimize the value of the evaluation function within a range in which a restriction condition that the linear matrix inequality holds is satisfied, by arithmetic processing according to a solution method for a quadratic programming problem. The device then integrates ↑Vb_cmd2 to sequentially determine desired values of the position and posture of the particular site (the body) 2 of the robot 1. The linear matrix inequality is set to satisfy a condition restricting the operations of the joints between the particular site 2 and the distal portion of each leg link 3.

7 Claims, 11 Drawing Sheets

(56) References Cited

U.S. PATENT DOCUMENTS

| | | | |
|---|---|---|---|
| 5,594,644 A * | 1/1997 | Hasegawa et al. | 701/23 |
| 6,876,903 B2 * | 4/2005 | Takenaka | 700/245 |
| 2012/0165987 A1 * | 6/2012 | Kim et al. | 700/261 |
| 2012/0245735 A1 * | 9/2012 | Lee et al. | 700/255 |
| 2013/0131865 A1 * | 5/2013 | Yamane | 700/254 |

OTHER PUBLICATIONS

Japanese Office Action dated Apr. 15, 2014, 3 pages.

* cited by examiner

TRAJECTORY OF DESIRED LEG POSITION/POSTURE

GAIT GENERATING DEVICE FOR LEGGED MOBILE ROBOT AND OPERATIONAL TARGET GENERATING DEVICE FOR ROBOT

BACKGROUND OF THE INVENTION

1. Field of the Invention

The present invention relates to a gait generating device for a legged mobile robot and an operational target generating device for a robot.

2. Description of the Related Art

Conventionally, as a technique of generating a desired gait of a legged mobile robot, a technique of setting targets for the translational momentum vector of the entire mobile robot (the translational momentum vector of the overall center of gravity) and the angular momentum vector of the entire mobile robot, and generating a desired gait that defines the displacement amount of each joint of the mobile robot so as to satisfy the targets has been proposed, as seen in, for example, "Resolved Momentum Control: Motion Generation of a Humanoid Robot based on the Linear and Angular Momenta", Kajita, Kanehiro, Kaneko, Fujiwara, Harada, Yokoi, and Hirukawa, Journal of Robotics Society of Japan, Vol. 22, No. 6, pp. 772-779, 2004 (hereinafter, referred to as "Non-Patent Document 1").

Further, a technique of generating a gait of a bipedal mobile robot by using the above-described technique is disclosed in, for example, PCT International Publication No. WO2008/105506 (hereinafter, referred to as "Patent Document 1").

SUMMARY OF THE INVENTION

In a variety of robots including a legged mobile robot, the displacement amounts of joints of the robot and the temporal change rates of the displacement amounts (the displacement velocities of the joints) are generally subject to restrictions due to the mechanical constructions of the joints or the joint driving mechanisms, or the capabilities of the actuators that drive the joints. Therefore, the displacement amounts of the joints and the temporal change rates of the displacement amounts (the displacement velocities of the joints) are made to be changeable within certain variable ranges defined by those restrictions.

This means that, in the case of determining an operational target such as a desired gait for a robot, the displacement amounts of the joints or the temporal change rates thereof defined by the operational target need to be set within the variable ranges thereof.

With the conventional techniques as described in the aforesaid Patent Document 1 and Non-Patent Document 1, the restriction conditions regarding the variable ranges of the displacement amounts of the joints of the robot and/or the temporal change rates thereof have not been taken into consideration. This raises the possibility that, depending on the stride in a desired gait of the robot, or the desired translational momentum vector, or the desired angular momentum vector, a desired gait may be generated in which the displacement amount of one or more joints of the leg links or the temporal change rate(s) thereof would go beyond the variable range.

In such a case, the desired displacement amount of the joint or the temporal change rate thereof will have to be forcibly restricted to the upper or lower limit of the variable range thereof. As a result, an operational target impairing the smoothness in operation of the robot, or an operational target varying from the intended operational target ensuring a proper operation of the robot will be determined inevitably.

Alternatively, for the purposes of avoiding such an inconvenience, the generable form of the operational target of the robot may be restricted to a limited form that can reliably satisfy the restriction conditions regarding the variable ranges of the displacement amounts of the joints of the robot or the temporal change rates thereof.

The present invention has been made with the view of the background described above and it is an object of the present invention to provide a gait generating device configured to generate a desired gait for causing a legged mobile robot as an example of a robot to travel, which device is able to generate the desired gait of the robot in a manner appropriately reflecting the restriction conditions that restrict the operations of the joints in each leg link thereof.

Further, as a more general aspect, it is an object of the present invention to provide an operational target generating device for a variety of robots, which device is able to generate an operational target for moving a link mechanism extended from a particular site of the robot, in a manner appropriately reflecting the restriction conditions that restrict the operations of the joints in the link mechanism.

In order to achieve the above-described object, the present invention provides a gait generating device for a legged mobile robot which travels by motions of a plurality of leg links extended from a body, each leg link having a plurality of joints, the gait generating device sequentially generating a desired gait defining displacement amounts of the respective joints of the mobile robot, the gait generating device including:

a desired leg position/posture determining unit that sequentially determines a desired leg position/posture as a constituent element of the desired gait, the desired leg position/posture being desired values of the position and posture of a distal portion of each leg link of the mobile robot;

a desired control object vector determining unit that sequentially determines a desired control object vector as a desired value of a control object vector, the control object vector being expressed as a vector obtained by linearly mapping a particular-site motion velocity vector having, as its components, change amounts per unit time of the position and posture of a particular site, the particular site being either the body of the mobile robot or a site other than the plurality of leg links that is connected to the body;

a Jacobian matrix determining unit that sequentially determines a Jacobian matrix representing the linear mapping by using at least a latest desired gait among the already determined desired gaits of the mobile robot;

a desired particular-site motion velocity value determining unit that uses a predetermined quadratic evaluation function, having the particular-site motion velocity vector as a variable and configured to yield a value varying in accordance with at least a difference between the determined desired control object vector and a vector obtained by multiplying the particular-site motion velocity vector by the determined Jacobian matrix, and also uses at least one linear matrix inequality having the particular-site motion velocity vector as a variable, to sequentially calculate a value of the particular-site motion velocity vector that can minimize the value of the evaluation function within a range in which a restriction condition that the linear matrix inequality holds is satisfied, by arithmetic processing according to a solution method for a quadratic planning problem, and to sequentially determine the calculated value of the particular-site motion velocity vector as a desired value of the particular-site motion velocity vector; and a desired particular-site position/posture determining unit that sequentially integrates the determined desired values of the particular-site motion velocity vector to sequentially determine a desired particular-site position/posture as a constituent element of the desired gait, the desired particular-site position/posture being desired values of the position and posture of the particular site, wherein the linear matrix inequality used by the desired particular-site motion velocity value determining unit in the arithmetic processing according to the solution method for the quadratic programming problem is set to satisfy a joint operation restriction condition that restricts, for each of the joints between the particular site and the distal portion of the corresponding leg link, a value of at least one of a displacement amount of the joint and a joint velocity as a temporal change rate thereof (a first aspect of the invention).

According to the first aspect of the invention, the desired leg position/posture of each leg link (desired values of the position and posture of the distal portion of each leg link), determined by the desired leg position/posture determining unit, and the desired particular-site position/posture (desired values of the position and posture of the particular site), determined by the desired particular-site position/posture determining unit by sequentially integrating the desired value of the particular-site motion velocity vector (having as its components the change amounts per unit time of the position and posture of the particular site) sequentially determined by the desired particular-site motion velocity value determining unit, are sequentially determined as the constituent elements of the desired gait.

In this case, the desired particular-site motion velocity value determining unit that determines the desired value of the particular-site motion velocity vector sequentially calculates the value of the particular-site motion velocity vector that can minimize the value of the evaluation function within a range in which the restriction condition that the linear matrix inequality holds is satisfied, by arithmetic processing according to a solution method for a quadratic programming problem. The desired particular-site motion velocity value determining unit then sequentially determines the calculated value of the particular-site motion velocity vector as the desired value of the particular-site motion velocity vector.

Here, the above-described evaluation function is a predetermined quadratic evaluation function that has the particular-site motion velocity vector as a variable, and that is configured such that its value changes in accordance with at least a difference between the determined desired control object vector and a vector obtained by multiplying the particular-site motion velocity vector by the determined Jacobian matrix.

Further, the aforesaid linear matrix inequality is a linear matrix inequality having the particular-site motion velocity vector as a variable.

Thus, the processing of obtaining the value of the particular-site motion velocity vector that can minimize the value of the aforesaid evaluation function within the range in which the restriction condition that the aforesaid linear matrix inequality holds is satisfied can be implemented by arithmetic processing according to a solution method for a so-called quadratic programming problem. For the arithmetic processing for solving a quadratic programming problem, a variety of techniques enabling the solutions to be determined at a relatively high speed are known in the art.

Thus, in the first aspect of the invention, the desired particular-site motion velocity value determining unit sequentially determines the desired value of the particular-site motion velocity vector by the arithmetic processing according to the solution method for the quadratic programming problem as described above.

It is noted that a known technique may be used in the arithmetic processing for solving the quadratic programming problem. For example, an interior-point-convex algorithm or a trust-region-reflective algorithm may be used.

Further, the motion velocity vector of the distal portion of each leg link of the mobile robot (the temporal change rates of the position and posture of the distal portion) depends on the aforesaid particular-site motion velocity vector (the temporal change rates of the position and posture of the particular site) and the joint velocity (the temporal change rate of the displacement amount) of each of the joints between the particular site and the distal portion of the leg link. The motion velocity of the distal portion of each leg link of the mobile robot is defined by the trajectory (the time series) of the aforesaid desired leg position/posture.

Therefore, the aforesaid linear matrix inequality as the restriction condition regarding the aforesaid particular-site motion velocity vector can be set by reflecting the restriction condition (the aforesaid joint operation restriction condition) that restricts the displacement amount or its temporal change rate of each of the joints between the particular site and the distal portion of the leg link.

In more detail, the aforesaid linear matrix inequality can be set such that the joint operation restriction condition is satisfied when the linear matrix inequality holds. In other words, the condition that the aforesaid linear matrix inequality holds can be made to be a sufficient condition for satisfying the aforesaid joint operation restriction condition.

Thus, in the first aspect of the invention, the aforesaid linear matrix inequality used by the desired particular-site motion velocity value determining unit in the arithmetic processing according to the solution method for the quadratic programming problem has been set to satisfy the joint operation restriction condition that restricts, for each of the joints between the particular site and the distal portion of each leg link, the value of at least one of the displacement amount of the joint and a joint velocity as the temporal change rate thereof.

With this configuration, the joint operation restrictive condition is converted to the condition that the linear matrix inequality holds. Therefore, determining a desired value of the particular-site motion velocity vector, by the desired particular-site motion velocity value determining unit, as a value of the particular-site motion velocity vector that can minimize the value of the aforesaid evaluation function within the range in which the restriction condition that the aforesaid linear matrix inequality holds is satisfied in the above-described manner makes it possible to ultimately determine a desired value of the particular-site motion velocity vector that can minimize the value of the aforesaid evaluation function within the range in which the aforesaid joint operation restriction condition is satisfied.

In this case, the aforesaid evaluation function is a quadratic evaluation function configured such that its value changes in accordance with the difference between the determined desired control object vector and the vector obtained by multiplying the particular-site motion velocity vector by the determined Jacobian matrix. Therefore, the desired value of the particular-site motion velocity vector is sequentially determined such that a vector obtained by multiplying the desired value of the particular-site motion velocity vector by the determined Jacobian matrix coincides with, or approximately coincides with, the determined desired control object vector as much as possible, within the range in which the aforesaid joint operation restriction condition is satisfied.

It is noted that in this case, the desired control object vector has the meaning as the value of the control object vector required for the mobile robot to appropriately perform a required moving operation. Further, the vector obtained by multiplying the desired value of the particular-site motion velocity vector by the determined Jacobian matrix corresponds to the value of the control object vector corresponding to the ultimately determined desired gait.

Thus, the desired value of the particular-site motion velocity vector and, hence, the desired gait are determined so as to achieve the target regarding the control object vector to the greatest possible extent, while fulfilling the restrictions on the operations of the joints (between the particular site and the distal portion of each leg link) according to the aforesaid joint operation restriction condition.

In particular, even in the situation where the operations (displacement amounts and/or joint velocities) of the joints between the particular site and the distal portion of each leg link are near the limits defined by the joint operation restriction condition, the desired value of the particular-site motion velocity vector can be determined such that the vector obtained by multiplying the desired value of the particular-site motion velocity vector by the determined Jacobian matrix is prevented from deviating from the aforesaid desired control object vector as much as possible.

Therefore, according to the first aspect of the invention, when a desired gait for causing a legged mobile robot to travel is to be generated, the desired gait of the robot can be generated in a manner appropriately reflecting the restriction condition that restricts the operations of the joints of each leg link.

As a more specific embodiment of the first aspect of the invention, for example the following embodiment is suitable. In the suitable embodiment, the joint operation restriction condition includes at least a condition that the value of the joint velocity of each of the joints between the particular site and the distal portion of the corresponding leg link falls within a predetermined variable range thereof, and the linear matrix inequality used by the desired particular-site motion velocity value determining unit in the arithmetic processing according to the solution method for the quadratic programming problem includes two linear matrix inequalities expressed by the following expressions (100a) and (100b) for each of the leg links.

Then, $\uparrow\omega\_i\_min$ in the following expression (100a) is set such that a value of each component of $\uparrow\omega\_i\_min$ takes a value not smaller than a lower limit of the variable range of the joint velocity of the joint corresponding to that component among the joints between the particular site and the distal portion of the corresponding leg link, and $\uparrow\omega\_i\_max$ in the following expression (100b) is set such that a value of each component of $\uparrow\omega\_i\_max$ takes a value not greater than an upper limit of the variable range of the joint velocity of the joint corresponding to that component among the joints between the particular site and the distal portion of the corresponding leg link (a second aspect of the invention).

$$C\_i \cdot \uparrow Vs + (\uparrow c\_i - \uparrow \omega\_i\_min) \geq \uparrow 0 \qquad (100a)$$

$$-C\_i \cdot \uparrow Vs + (-\uparrow c\_i + \uparrow \omega\_i\_max) \geq \uparrow 0 \qquad (100b)$$

where
the suffix i: identification number of a leg link,
$C\_i$: matrix defined by $C\_i \equiv -(J\_i)^{-1} \cdot B\_i$,
$\uparrow c\_i$: vector defined by $\uparrow c\_i \equiv (J\_i)^{-1} \cdot \uparrow Vft\_i$,
$(J\_i)^{-1}$: inverse matrix or pseudo inverse matrix of $J\_i$,
$J\_i$: Jacobian matrix representing linear mapping from $\uparrow\omega\_i$ to $\uparrow Vft\_i$,
$\uparrow\omega\_i$: vector having, as its components, joint velocities of the respective joints present between the particular site and the distal portion of the i-th leg link,
$\uparrow Vft\_i$: vector having, as its components, a temporal change rate of the position of the distal portion of the i-th leg link and a temporal change rate of the posture of the distal portion,
$B\_i$: matrix representing linear mapping from $\uparrow Vs$ to $\uparrow Vft\_i$,
$\uparrow Vs$: the particular-site motion velocity vector,
$\uparrow\omega\_i\_min$: vector composed of lower limits of permissible ranges of the respective components of $\uparrow\omega\_i$,
$\uparrow\omega\_i\_max$: vector composed of upper limits of the permissible ranges of the respective components of $\uparrow\omega\_i$, and
$\uparrow 0$: null vector.

It is noted that the permissible range of each component of $\uparrow\omega\_i$ means the range encompassed by (or coinciding with) the variable range (the variable range defined by the capability of the joint actuator etc.) of the joint velocity of the joint corresponding to each component of $\uparrow\omega\_i$.

According to the second aspect of the invention, with the value of each component of $\uparrow\omega\_i\_min$ in the above expression (100a) and the value of each component of $\uparrow\omega\_i\_max$ in the above expression (100b) set in the above-described manner, the linear matrix inequalities of the above expressions (100a) and (100b) for each leg link are set such that, when these linear matrix inequalities hold, the restriction condition that the joint velocity of each joint between the particular site and the distal portion of the corresponding leg link falls within the range between the upper and lower limits of its variable range is satisfied.

This configuration makes it possible to determine the desired value of the particular-site motion velocity vector so as to minimize the value of the aforesaid evaluation function, while causing the joint velocity of each joint between the particular site and the distal portion of each leg link to fall within the range between the upper and lower limits of the variable range thereof.

In the second aspect of the invention, it is more preferable that the joint operation restriction condition further includes a condition that the value of the displacement amount of each of the joints between the particular site and the distal portion of the corresponding leg link falls within a predetermined variable range thereof, and the desired particular-site motion velocity value determining unit includes a unit for setting $\uparrow\omega\_i\_min$ in the above expression (100a), in accordance with latest desired joint displacement amounts which are the displacement amounts of the joints defined by the latest desired gait, such that the value of each component of $\uparrow\omega\_i\_min$ takes a value not smaller than the lower limit of the variable range of the joint velocity of the joint corresponding to that component among the joints between the particular site and the distal portion of the corresponding leg link and such that as the latest desired joint displacement amount of the joint approaches a lower limit of the variable range of the displacement amount of the joint, the value of the component of $\uparrow\omega\_i\_min$ corresponding to the joint decreases to approach zero, and a unit for setting $\uparrow\omega\_i\_max$ in the above expression (100b), in accordance with the latest desired joint displacement amounts, such that the value of each component of $\uparrow\omega\_i\_max$ takes a value not greater than the upper limit of the variable range of the joint velocity of the joint corresponding to that component among the joints between the particular site and the distal portion of the corresponding leg link and such that as the latest desired joint displacement amount of the joint approaches an upper limit of the variable range of the displacement amount of the joint, the value of the component of $\uparrow\omega\_i\_max$ corresponding to the joint decreases to approach zero (a third aspect of the invention).

According to the third aspect of the invention, with the value of each component of ↑ω_i_min in the above expression (100a) being set in the above-described manner, when the latest desired joint displacement amount of each joint between the particular site and the distal portion of the corresponding leg link approaches the lower limit of the variable range of the displacement amount of that joint, the value of the component of ↑ω_i_min corresponding to that joint is ultimately set to zero. This makes it possible to set the linear matrix inequality of the expression (100a) such that the displacement amount of the joint is prevented from further decreasing below the lower limit of the variable range thereof.

Similarly, with the value of each component of ↑ω_i_max in the above expression (100b) being set in the above-described manner, when the latest desired joint displacement amount of each joint between the particular site and the distal portion of the corresponding leg link approaches the upper limit of the variable range of the displacement amount of that joint, the value of the component of ↑ω_i_max corresponding to that joint is ultimately set to zero. This makes it possible to set the linear matrix inequality of the expression (100b) such that the displacement amount of the joint is prevented from further increasing beyond the upper limit of the variable range thereof.

As such, the linear matrix inequalities of the above expressions (100a) and (100b) for each leg link are set such that the restriction condition that the joint velocity of each joint between the particular site and the distal portion of the corresponding leg link falls within the range between the upper and lower limits of the variable range thereof is satisfied and such that the restriction condition that the displacement amount of each joint between the particular site and the distal portion of the corresponding leg link falls within the range between the upper and lower limits of the variable range thereof is also satisfied when those linear matrix inequalities hold.

Therefore, according to the third aspect of the invention, it is possible to determine the desired value of the particular-site motion velocity vector so as to minimize the value of the aforesaid evaluation function, while causing the displacement amount and the joint velocity of each joint between the particular site and the distal portion of the corresponding leg link to fall respectively within the ranges between the upper and lower limits of the variable ranges thereof.

In the first through third aspects of the invention, as the aforesaid control object vector, a vector consisting of the components of a translational momentum vector of the overall center of gravity of the mobile robot and the components of an angular momentum vector about the overall center of gravity of the mobile robot, for example, may be adopted. In this case, however, the position or posture of the body of the mobile robot may come to deviate from the position or posture appropriate for the mobile robot to move stably.

Therefore, in the first through third aspects of the invention, it is desirable to adopt the following embodiment.

Namely, the gait generating device further includes: a basic desired operation value determining unit that uses a dynamic model representing a dynamics of the mobile robot and the determined desired leg position/posture to sequentially determine a basic desired body position/posture as basic desired values of the position and posture of the body of the mobile robot, a basic desired overall center of gravity as a basic desired value of the position of the overall center of gravity of the mobile robot, a basic desired translational momentum vector as a basic desired value of a translational momentum vector of the overall center of gravity of the mobile robot, and a basic desired angular momentum vector as a basic desired value of an angular momentum vector about the overall center of gravity of the mobile robot, such that a dynamic restriction condition for the mobile robot to perform motion is satisfied on the dynamic model;

a desired-gait center-of-gravity calculating unit that sequentially calculates a desired-gait overall center of gravity from the desired gait, on the basis of a geometric model of the mobile robot, the desired-gait overall center of gravity being a position of the overall center of gravity of the mobile robot corresponding to the desired gait having the determined desired leg position/posture and the determined desired body position/posture as constituent elements thereof;

a basic desired translational momentum correcting unit that sequentially determines a corrected basic desired translational momentum vector by correcting the determined basic desired translational momentum vector by a feedback manipulated variable, the feedback manipulated variable being determined in accordance with a deviation between the calculated desired-gait overall center of gravity and the determined basic desired overall center of gravity so as to cause the desired-gait overall center of gravity to track the basic desired overall center of gravity; and a basic desired body motion velocity determining unit that uses as the particular-site motion velocity vector a vector having as its components the change amounts per unit time of the position and posture of the body as the particular site, to sequentially determine a basic desired body motion velocity vector as a basic desired value of the particular-site motion velocity vector, in accordance with a deviation between the determined desired body position/posture and the determined basic desired body position/posture, so as to cause the desired body position/posture to track the basic desired body position/posture, wherein the control object vector is a vector comprising the components of the particular-site motion velocity vector, the components of the translational momentum vector of the overall center of gravity of the mobile robot, and the components of the angular momentum vector about the overall center of gravity of the mobile robot, and the desired control object vector determining unit determines a vector comprising the components of the determined basic desired body motion velocity vector, the components of the determined corrected basic desired translational momentum vector, and the components of the determined basic desired angular momentum vector, as the desired control object vector (a fourth aspect of the invention).

According to the fourth aspect of the invention, the desired value of the particular-site motion velocity vector (here, the vector having as its components the change amounts per unit time of the position and posture of the body as the particular site) is determined by setting, as its targets, not only the value of the translational momentum vector of the overall center of gravity of the mobile robot (the aforesaid corrected basic desired translational momentum vector) and the value of the angular momentum vector about the overall center of gravity (the aforesaid basic desired angular momentum vector), which are components constituting the desired control object vector, but also the value of the particular-site motion velocity vector (the aforesaid basic desired body motion velocity vector), which is included in the desired control object vector.

Namely, the desired value of the particular-site motion velocity vector is basically determined such that the translational momentum vector of the overall center of gravity of the mobile robot and the angular momentum vector about the overall center of gravity that accompany the changes in position and posture of the body (changes from the current state of the desired gait) generated in correspondence with the desired value of the particular-site motion velocity vector will respectively track the values defined by the desired control object vector, within the range in which the restriction condition that the aforesaid linear matrix inequalities hold is satisfied, and such that the position and posture of the body will not deviate from the values defined by the desired control object vector.

In this case, of the aforesaid desired control object vector, the aforesaid corrected basic desired translational momentum vector as the translational momentum vector of the overall center of gravity of the mobile robot is a vector obtained by correcting the basic desired translational momentum vector determined by the aforesaid basic desired operation value determining unit by a feedback manipulated variable that is determined in accordance with the deviation between the desired-gait overall center of gravity that corresponds to the already determined desired gait and the basic overall center of gravity that is determined by the aforesaid basic desired operation value determining unit.

Further, of the aforesaid desired control object vector, the angular momentum vector about the overall center of gravity of the mobile robot is the basic desired angular momentum vector determined by the aforesaid basic desired operation value determining unit.

Accordingly, the translational momentum vector of the overall center of gravity of the mobile robot and the angular momentum vector about the overall center of gravity constituting the aforesaid desired control object vector are determined so as to cause the translational momentum vector of the overall center of gravity of the mobile robot, the position of the overall center of gravity, and the angular momentum about the overall center of gravity, which are defined by the desired gait to be determined, to track the basic desired translational momentum vector, the basic desired overall center of gravity, and the basic desired angular momentum vector, respectively, which are determined by the aforesaid basic desired operation value determining unit such that the dynamic restriction condition for the mobile robot to perform motion is satisfied on the aforesaid dynamic model.

It is noted that the above-described dynamic restriction condition is the condition that restricts the external force acting on the mobile robot or the inertial force generated by the motion of the mobile robot, so as to allow the mobile robot to perform a predetermined motion from the standpoint of dynamics. The restriction condition may include, for example, the condition that a zero moment point (ZMP) falls within a supporting polygon, the condition that the translational floor reaction force acting on the mobile robot falls within a certain permissible range, etc.

Further, of the aforesaid desired control object vector, the basic desired body motion velocity vector as the basic desired value of the aforesaid particular-site motion velocity vector is determined in accordance with the deviation between the already determined desired body position/posture and the basic desired body position/posture so as to make the desired body position/posture track the basic desired body position/posture.

Therefore, by determining the desired value of the particular-site motion velocity vector with the above-described desired control object vector as its target, it is ensured that the desired gait to be ultimately determined sequentially, with the desired particular-site position/posture (the desired values of the position and posture of the body) obtained by integrating the desired value of the particular-site motion velocity vector as its constituent element, is determined such that the translational momentum vector of the overall center of gravity of the mobile robot and the angular momentum vector about the overall center of gravity, defined by the ultimately determined desired gait, will respectively track the above-described corrected basic translational momentum vector and the basic angular momentum vector, and such that the desired particular-site position/posture in that desired gait (the desired values of the position and posture of the body) will not deviate from the above-described basic desired body position/posture.

Therefore, according to the fourth aspect of the invention, it is possible to generate a desired gait that makes it possible to cause the translational momentum vector and the angular momentum vector of the entire legged mobile robot to track their targets, while preventing the position and posture of the body of the legged mobile robot from deviating from the appropriate state, within the range in which the joint operation restriction condition on each joint between the body and the distal portion of the corresponding leg link can be satisfied.

Further, in this case, the corrected basic desired translational momentum vector, the basic desired angular momentum vector, and the basic desired body motion velocity vector constituting the desired control object vector have been determined in the above-described manner. Thus, in other words, the desired gait to be ultimately determined sequentially is determined so as not to deviate from the dynamic restriction condition on the aforesaid dynamic model, and also to prevent the desired particular-site position/posture in that desired gait (the desired values of the position and posture of the body) from deviating from the basic desired body position/posture determined to enable an appropriate motion on the dynamic model.

Therefore, according to the fourth aspect of the invention, it is possible to generate a desired gait that meets the joint operation restriction condition on each joint between the body and the distal portion of each leg link and satisfies the requirements in terms of dynamics, and also prevents the mobile robot from losing its balance.

In the aforesaid first through fourth aspects of the invention, the position and posture of the particular site of the mobile robot as the integrals of the particular-site motion velocity vector may often have a nonlinear relationship with the state quantities corresponding to the integrals of the aforesaid control object vector (for example, the state quantity corresponding to the integral of the translational momentum vector of the overall center of gravity of the mobile robot and the state quantity corresponding to the integral of the angular momentum vector about the overall center of gravity of the mobile robot).

For this reason, in the processing in the aforesaid Jacobian matrix determining unit, if the aforesaid Jacobian matrix representing the linear mapping from the aforesaid particular-site motion velocity vector to the control object vector is sequentially determined by using the latest desired gait among the already determined desired gaits of the mobile robot, that is, if the Jacobian matrix is determined by setting the latest desired gait as the motional state of the mobile robot as the starting point from which the position and posture of the particular site will change in accordance with a new desired value of the particular-site motion velocity vector, then the desired value of the particular-site motion velocity vector determined to minimize the value of the aforesaid evaluation function may become too large or too small for satisfying the desired control object vector.

In view of the foregoing, in the first through fourth aspects of the invention, it is preferable that when newly determining the Jacobian matrix representing linear mapping from the particular-site motion velocity vector to the control object vector, the Jacobian matrix determining unit estimates, on the basis of the latest desired gait and at least one past desired gait immediately preceding the latest desired gait, an instantaneous value of a future gait of the mobile robot within a period between a time corresponding to the latest desired gait among the already determined desired gaits of the mobile robot and a time corresponding to a new desired gait having as its constituent element a desired particular-site position/posture determined by the desired particular-site position/posture determining unit in accordance with a new desired value of the particular-site motion velocity vector, and the Jacobian matrix determining unit uses the estimated instantaneous value of the future gait as a motional state of the mobile robot at a starting point of the changes of the position and posture of the particular site by the particular-site motion velocity vector, to determine the Jacobian matrix corresponding to the motional state of the starting point of the mobile robot (a fifth aspect of the invention).

According to the fifth aspect of the invention, the aforesaid Jacobian matrix is determined by using the motional state of the mobile robot that is shifted from the motional state defined by the latest desired gait toward the motional state expected in the future, as the starting point of the changes in position and posture of the particular site by the aforesaid particular-site motion velocity vector (in other words, the change of the integral of the particular-site motion velocity vector).

This configuration makes it possible to determine a desired value of the particular-site motion velocity vector that can compensate for the effects of the above-described nonlinearity and that is improved in the degree of coincidence with the value of the particular-site motion velocity vector that is optimal for implementation of the desired control object vector. Consequently, a desired gait that can fulfill the desired control object vector to the greatest possible extent can be generated with high reliability.

In the fifth aspect of the invention, as a more specific form, the following configuration can be adopted. Namely, the desired particular-site motion velocity value determining unit includes a unit that estimates a future instantaneous value of the desired particular-site position/posture by adding to the desired particular-site position/posture in the latest desired gait a correction amount obtained by multiplying a difference between the desired particular-site position/posture in the latest desired gait and the desired particular-site position/posture in the past desired gait immediately preceding the latest desired gait by a coefficient Kp predetermined within a range between "0" and "1", and a unit that estimates, for each leg link, a future instantaneous value of the desired leg position/posture of the leg link by adding to the desired leg position/posture in the latest desired gait a correction amount obtained by multiplying a difference between the desired leg position/posture in the latest desired gait and the desired leg position/posture in the past desired gait immediately preceding the latest desired gait by the coefficient Kp, and the desired particular-site motion velocity value determining unit uses a gait having as its constituent elements the estimated future instantaneous value of the desired particular-site position/posture and the estimated future instantaneous value of the desired leg position/posture of each leg link as the motional state of the starting point of the mobile robot (a sixth aspect of the invention).

According to the sixth aspect of the invention, by the use of the above-described coefficient Kp, the instantaneous value of the future gait of the mobile robot within a period between the time corresponding to the latest desired gait and the time corresponding to the aforesaid new desired gait can be estimated, appropriately and in a simple manner, from the latest desired gait and the past desired gait immediately preceding the latest desired gait among the already determined desired gaits.

The first through sixth aspects of the invention described above assume a legged mobile robot as the robot. However, the technique of sequentially determining a desired value of a particular-site motion velocity vector using the evaluation function and linear matrix inequality as in the first aspect of the invention by arithmetic processing according to a solution method for a quadratic programming problem is applicable to a variety of types of robots besides the legged mobile robot.

Therefore, in the present invention, as a more generalized aspect of the first aspect of the invention, an operational target generating device for a robot has been constructed. This operational target generating device is for a robot having a particular site and a link mechanism extended from the particular site, the particular site having its spatial position and posture movable, the link mechanism having a plurality of joints, the operational target generating device sequentially generating an operational target defining displacement amounts of the respective joints of the robot, the operational target generating device including:

a desired link-mechanism distal-portion position/posture determining unit that sequentially determines a desired link-mechanism distal-portion position/posture as a constituent element of the operational target, the desired link-mechanism distal-portion position/posture being desired values of the position and posture of a distal portion of the link mechanism;

a desired control object vector determining unit that sequentially determines a desired control object vector as a desired value of a control object vector, the control object vector being expressed as a vector obtained by linearly mapping a particular-site motion velocity vector having, as its components, change amounts per unit time of the position and posture of the particular site of the robot;

a Jacobian matrix determining unit that sequentially determines a Jacobian matrix representing the linear mapping by using at least a latest operational target among the already determined operational targets of the robot;

a desired particular-site motion velocity value determining unit that uses a predetermined quadratic evaluation function, having the particular-site motion velocity vector as a variable and configured to yield a value varying in accordance with at least a difference between the determined desired control object vector and a vector obtained by multiplying the particular-site motion velocity vector by the determined Jacobian matrix, and also uses at least one linear matrix inequality having the particular-site motion velocity vector as a variable, to sequentially calculate a value of the particular-site motion velocity vector that can minimize the value of the evaluation function within a range in which a restriction condition that the linear matrix inequality holds is satisfied, by arithmetic processing according to a solution method for a quadratic planning problem, and to sequentially determine the calculated value of the particular-site motion velocity vector as a desired value of the particular-site motion velocity vector; and a desired particular-site position/posture determining unit that sequentially integrates the determined desired values of the particular-site motion velocity vector to sequentially determine a desired particular-site position/posture as a constituent element of the operational target, the desired particular-site position/posture being desired values of the position and posture of the particular site, wherein the linear matrix inequality used by the desired particular-site motion velocity value determining unit in the arithmetic processing according to the solution method for the quadratic programming problem is set to satisfy a joint operation restriction condition that restricts, for each of the joints between the particular site and the distal portion of the link mechanism, a value of at least one of a displacement amount of the joint and a joint velocity as a temporal change rate thereof (a seventh aspect of the invention).

According to the seventh aspect of the invention, the desired link-mechanism distal-portion position/posture determining unit is provided in place of the desired leg position/posture determining unit in the first aspect of the invention. Further, the desired link-mechanism distal-portion position/posture (desired values of the position and posture of the distal portion of the link mechanism), determined by this desired link-mechanism distal-portion position/posture determining unit, and the desired particular-site position/posture (desired values of the position and posture of the particular site), determined by the desired particular-site position/posture determining unit by sequentially integrating the desired values of the particular-site motion velocity vector (the vector having as its components the change amounts per unit time of the position and posture of the particular site) sequentially determined by the desired particular-site motion velocity value determining unit, are sequentially determined as the constituent elements of the aforesaid operational target.

In this case, the processing in the desired control object vector determining unit, the Jacobian matrix determining unit, the desired particular-site motion velocity value determining unit, and the desired particular-site position/posture determining unit in the seventh aspect of the invention is carried out in the same manner as in the first aspect of the invention.

Further, in the seventh aspect of the invention, the linear matrix inequality used by the desired particular-site motion velocity value determining unit in the arithmetic processing according to the solution method for the quadratic programming problem is the linear matrix inequality set to satisfy the joint operation restriction condition that restricts a value of at least one of the displacement amount of each joint between the particular site and the distal portion of the link mechanism and the joint velocity as the temporal change rate thereof.

Therefore, according to the seventh aspect of the invention, the desired value of the particular-site motion velocity vector is sequentially determined such that a vector obtained by multiplying the particular-site motion velocity vector by the determined Jacobian matrix coincides with, or approximately coincides with, the determined desired control object vector as much as possible, within the range in which the aforesaid joint operation restriction condition is satisfied.

It is noted that in this case, the desired control object vector has the meaning as the value of the control object vector required for the robot to appropriately perform a predetermined operation. Further, the vector obtained by multiplying the desired value of the particular-site motion velocity vector by the determined Jacobian matrix corresponds to the value of the control object vector corresponding to the ultimately determined operational target.

Thus, the desired value of the particular-site motion velocity vector and, hence, the operational target are determined so as to achieve the target regarding the control object vector to the greatest possible extent, while fulfilling the restrictions on the operations of the joints (between the particular site and the distal portion of the link mechanism) according to the aforesaid joint operation restriction condition.

Therefore, according to the seventh aspect of the invention, in a variety of robots, the operational target of the robot (the operational target for moving a link mechanism extended from a particular site of the robot) can be generated in a manner appropriately reflecting the restriction condition that restricts the operations of the joints of the link mechanism.

DESCRIPTION OF THE PREFERRED EMBODIMENTS

First Embodiment

An embodiment of the present invention will be described below with reference to FIGS. 1 to 6.

Figure 1:
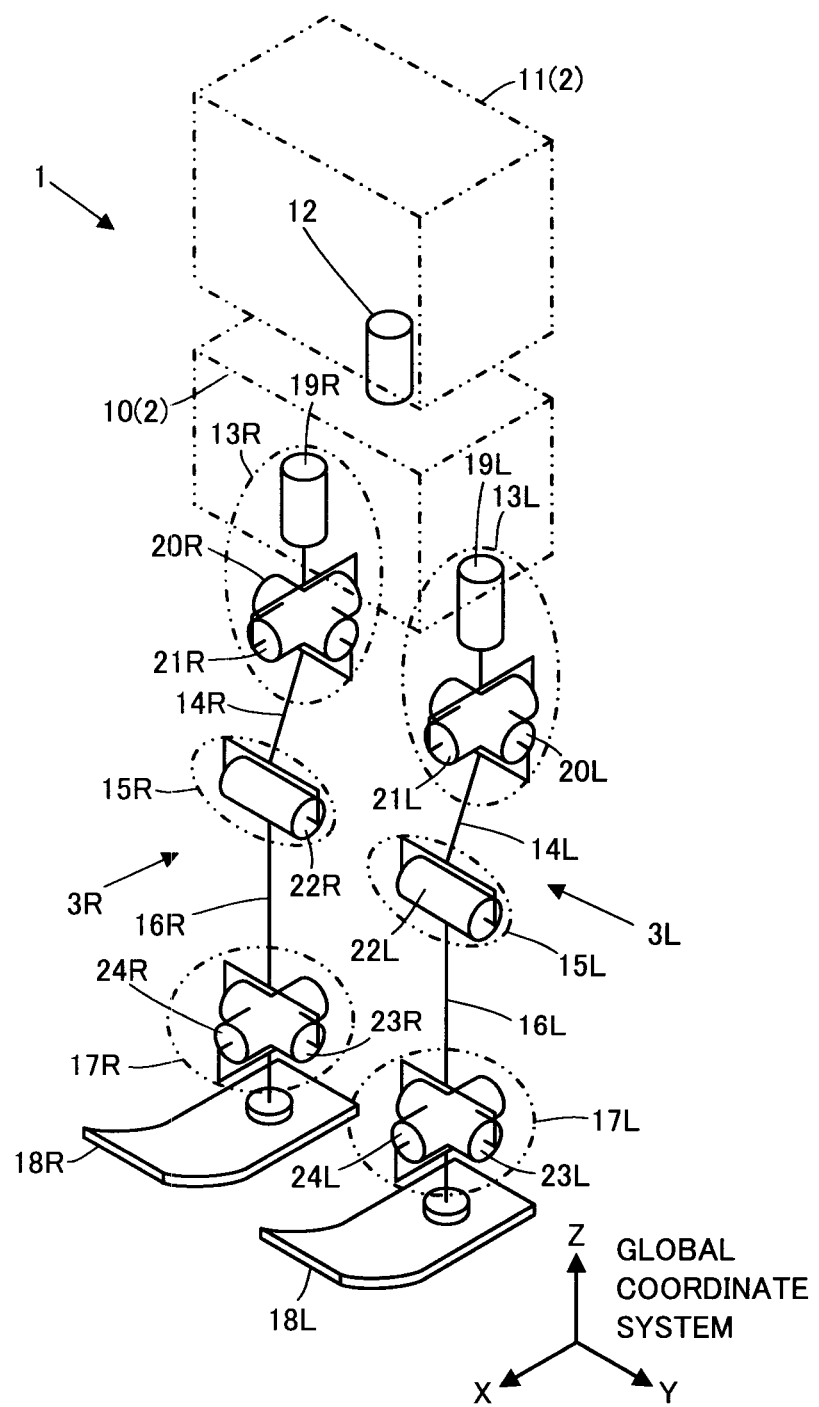
FIG. 1 is a diagram showing a schematic construction of a legged mobile robot in an embodiment of the present invention.

FIG. 1 is a schematic diagram illustrating the general construction of a legged mobile robot given as an example in the present embodiment. This legged mobile robot 1 (hereinafter, referred to simply as the robot 1) is a bipedal mobile robot which has a body 2 and a pair of right and left leg links 3R and 3L extended from the body 2.

In the present specification, a reference character "R" will be added to the reference characters indicating the members on the right side of the robot 1 facing forward or to the variables indicating the amounts related to those members, and a reference character "L" will be added to the reference characters indicating the members on the left side of the robot 1 facing forward or to the variables indicating the amounts related to those members. The reference characters "R" and "L", however, may be omitted when it is not particularly necessary to differentiate between the right and left sides.

The body 2 is a link portion corresponding to the upper body of the robot 1. In the present embodiment, the body 2 is composed of two element links of a lower body 10 and an upper body 11 arranged above the lower body 10. The lower body 10 corresponds to the waist of the robot 1, and the upper body 11 corresponds to the chest of the robot 1. The upper body 11 is connected to the lower body 10 through the intermediary of a body turning joint 12 which has a degree of rotational freedom about the yaw axis (about the Z axis).

The pair of right and left leg links 3R and 3L share the same construction. More specifically, each leg link 3 includes the following element links as its constituent elements: a thigh 14 which is connected to the lower body 10 through the intermediary of a hip joint 13, a crus 16 which is connected to the thigh 14 through the intermediary of a knee joint 15, and a foot 18 which is connected to the crus 16 through the intermediary of an ankle joint 17. In this case, the foot 18 constitutes the distal portion of each leg link 3.

The hip joint 13 of each leg link 3 is made up of three joints 19, 20, and 21 having degrees of rotational freedom about the yaw axis, the pitch axis (the Y axis), and the roll axis (the X axis), respectively. The knee joint 15 is made up of a joint 22 having a degree of rotational freedom about the pitch axis. The ankle joint 17 is made up of two joints 23 and 24 having degrees of rotational freedom about the pitch axis and the roll axis, respectively.

Therefore, in the present embodiment, the foot 18 constituting the distal portion of each leg link 3 has six degrees of movement freedom relative to the lower body 10. In the above description, the axes of rotation (roll axis, pitch axis, and yaw axis) of the joints 19 to 24 of each leg link 3 indicate the axes of rotation in the state where the leg link 3 is extended in the up-and-down direction.

The above has described the basic structure of the robot 1 in the present embodiment. In the robot 1 with this construction, six joints 19 to 24 of each leg link 3 are driven to implement spatial motion of each leg link 3. The motions of the leg links enable the robot 1 to travel on a floor. For example, the leg links 3R and 3L may be moved in a manner (gait) similar to that of a human walking or running operation, to thereby implement the walking or running operation of the robot 1.

Further, in the present embodiment, the lower body 10 and the upper body 11 constituting the body 2 are connected through the intermediary of the joint 12. This construction makes it possible to twist the body 2 about the axis of rotation of the joint 12, corresponding to the trunk axis of the body 2, by driving the joint 12.

Supplementarily, the robot 1 may include, not only the body 2 and the leg links 3R and 3L described above, but also, for example, arm links extended from the respective sides of the upper body 11, and a head mounted on the upper end of the upper body 11. Still alternatively, the joint 12 of the body 2 may be omitted, and the lower body 10 and the upper body 11 may be formed in one piece.

Figure 2:
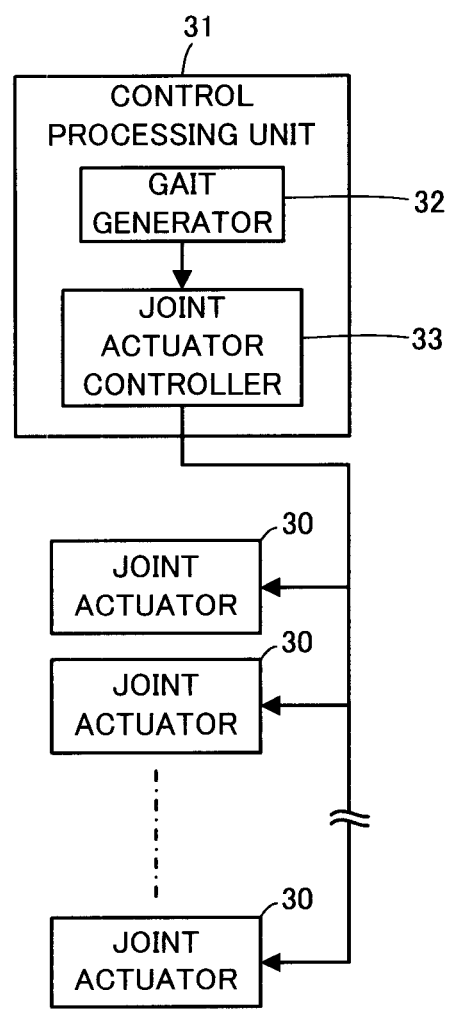
FIG. 2 is a diagram showing the configuration regarding the control of the legged mobile robot shown in FIG. 1.

Although not shown in FIG. 1, the robot 1 includes, as shown in FIG. 2, joint actuators 30 which rotate the corresponding ones of the aforesaid joints, and a control processing unit 31 which controls the operations of the robot 1.

The joint actuator 30, provided for each joint, is made up of an electric motor or a hydraulic actuator, for example. In this case, the drive mechanism of each joint by the joint actuator 30 may have a construction known in the art. Further, the joint actuator 30 is not limited to the rotary actuator; it may be a linear actuator.

The control processing unit 31 is an electronic circuit unit including a CPU, a RAM, a ROM, an interface circuit, and so on. The control processing unit 31 includes, as major features implemented by an installed program or the like, a gait generator 32 which sequentially generates a desired gait of the robot 1, and a joint actuator controller 33 which controls the displacement amounts (the rotational angles) of the joints of the robot 1, via the corresponding joint actuators 30, in accordance with the desired gait.

The gait generator 32 provides the control processing unit 31 with the features as the gait generating device or the operational target generating device of the present invention. The gait generator 32 carries out the processing of sequentially determining a desired leg position/posture, which is desired values of the spatial position and posture of the foot 18 constituting the distal portion of each leg link 3, and a desired body position/posture, which is desired values of the spatial position and posture of the body 2, as the constituent elements of the desired gait of the robot 1. The processing in the gait generator 32 will be described later in detail.

In the present embodiment, the body 2 includes the joint 12, allowing the upper body 11 to be twisted about the axis of rotation of the joint 12 relative to the lower body 10. Therefore, in more detail, the desired body position/posture in the present embodiment is configured with desired values of the spatial position and posture of the lower body 10 and a desired value of the twisting angle of the upper body 11 relative to the lower body 10 (i.e. the displacement amount of the joint 12).

Further, the position of the foot 18 of each leg link 3 is, in more detail, the position of a predetermined representative point of the foot 18, and the posture of the foot 18 means the spatial orientation of the foot 18. The same applies to the position and posture of the lower body 10.

These positions and postures are described as the positions and postures as seen in a global coordinate system which is the inertial coordinate system fixed to the floor surface in an operating environment of the robot 1. The global coordinate system may be designed arbitrarily. For example, a three-axis orthogonal coordinate system which has its origin on the floor surface immediately (or approximately) beneath the foot 18 of a supporting leg (which is one of the leg links 3R and 3L of the robot 1 that supports the self weight of the robot 1 when the foot 18 of the other leg link 3 as a free leg is moved in the air) when the foot 18 is in contact with the ground and which has a horizontal axis in the forward-and-backward direction of the foot 18 as the X axis, a horizontal axis in the lateral direction of the foot 18 as the Y axis, and the vertical axis as the Z axis (i.e. the so-called supporting leg coordinate system) may be used as the global coordinate system.

In the present embodiment, for the sake of convenience, the above-described supporting leg coordinate system will be used as the global coordinate system. The X, Y, and Z axes will mean the coordinate axes in the supporting leg coordinate system, unless otherwise specified.

Supplementarily, when the spatial position and posture of one of the lower and upper bodies 10 and 11 constituting the body 2 and the displacement amount of the joint 12 are determined, then the spatial position and posture of the other one of the lower and upper bodies 10 and 11 will be determined uniquely. Therefore, the desired body position/posture may be configured with a set of the desired values of the spatial position and posture of the upper body 11 and the desired value of the displacement amount of the joint 12.

The joint actuator controller 33 controls the joint actuators 30 corresponding to the respective joints of the robot 1 to cause the actual displacement amounts of the joints to track the desired values of the displacement amounts of the joints that are defined by the desired gait determined by the gait generator 32.

In this case, the actual displacement amount (rotational angle) of each joint is detected by a displacement amount sensor such as a rotary encoder (not shown). The joint actuator controller 33 controls the drive force of each joint actuator 30, by feedback control, in accordance with the deviation of the detected value of the actual displacement amount of each joint from the desired value thereof.

The processing carried out by the gait generator 32 in the control processing unit 31 will now be described in detail.

Figure 3:
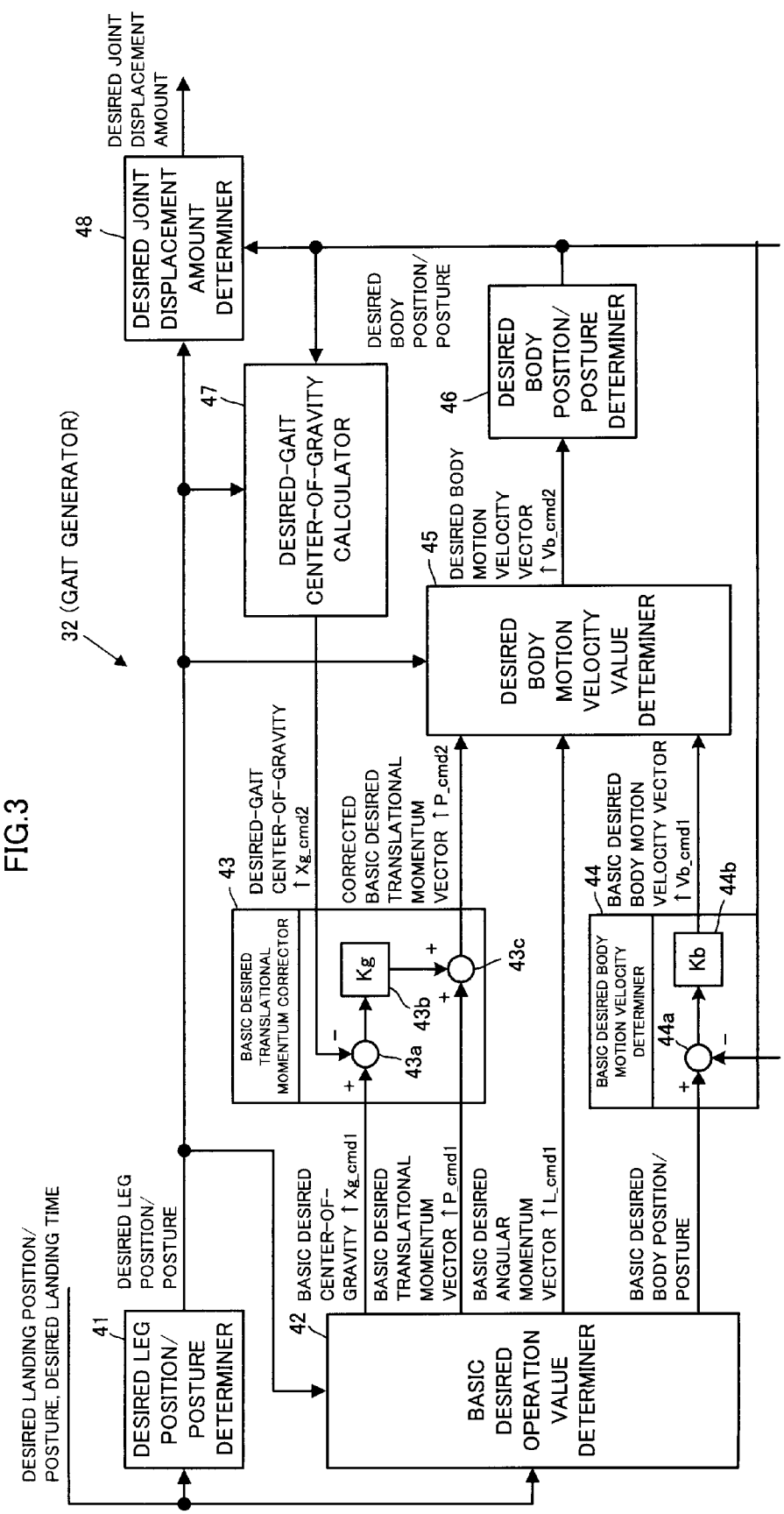
FIG. 3 is a block diagram showing the functions of a gait generator shown in FIG. 2.

As shown in FIG. 3, the gait generator 32 includes, as major processors for generating a desired gait, a desired leg position/posture determiner 41, which sequentially determines a desired leg position/posture, and a basic desired operation value determiner 42, which sequentially determines basic operational targets related to a predetermined kind of state quantities of the robot 1 other than the position and posture of the foot 18 of each leg link 3.

In this case, the operational targets to be determined by the basic desired operation value determiner 42 include: a basic desired center-of-gravity ↑Xg_cmd1, which is a basic desired value of the overall center of gravity of the robot 1, a basic desired translational momentum vector ↑P_cmd1, which is a basic desired value of the translational momentum vector of the entire robot 1 (=translational momentum vector of the overall center of gravity), a basic desired angular momentum vector ↑L_cmd1, which is a basic desired value of the overall angular momentum vector about the overall center of gravity of the robot 1, and a basic desired body position/posture, which is basic desired values of the position and posture of the body 2.

Each of the basic desired center-of-gravity ↑Xg_cmd1, the basic desired translational momentum vector ↑P_cmd1, and the basic desired angular momentum vector ↑L_cmd1 is a three-component vector (column vector) having the coordinate components of the global coordinate system as the constituent elements thereof. In the description of the present embodiment, "↑" is used to denote a vector (column vector).

The gait generator 32 also includes a basic desired translational momentum corrector 43, which sequentially determines a corrected basic desired translational momentum vector ↑P_cmd2 by correcting the basic desired translational momentum vector ↑P_cmd1 included in the basic operational targets determined by the basic desired operation value determiner 42, a basic desired body motion velocity determiner 44, which sequentially determines a basic desired body motion velocity vector ↑Vb_cmd1 as basic desired values of the change amounts per unit time (i.e. the change rates) of the position and posture of the body 2, and a desired body motion velocity value determiner 45, which sequentially determines a desired body motion velocity vector ↑Vb_cmd2 as desired values of the change amounts per unit time of the position and posture of the body 2, by using as the targets the corrected basic desired translational momentum vector ↑P_cmd2, the basic desired angular momentum vector ↑L_cmd1, and the basic desired body motion velocity vector ↑Vb_cmd1.

Each of the basic desired body motion velocity vector ↑Vb_cmd1 and the desired body motion velocity vector ↑Vb_cmd2 is a seven-component vector (column vector) configured with: the coordinate axis components of the translational motion velocity of the representative point of the body 2 (the representative point of the lower body 10 in the present embodiment) as seen in the global coordinate system, the angular velocity components about the respective coordinate axes of the posture of the body 2 (the posture of the lower body 10 in the present embodiment) as seen in the global coordinate system, and the temporal change rate (angular velocity) of the displacement amount of the joint 12 of the body 2.

Further, the desired body motion velocity vector ↑Vb_cmd2 is, in other words, the temporal change rate of the desired body position/posture in the desired gait that is sequentially determined by the gait generator 32.

The gait generator 32 further includes a desired body position/posture determiner 46, which sequentially determines a desired body position/posture by integrating (the respective components of) the desired body motion velocity vectors ↑Vb_cmd2 sequentially determined by the desired body motion velocity value determiner 45, and a desired-gait center-of-gravity calculator 47, which sequentially calculates a desired-gait center-of-gravity ↑Xg_cmd2 that is the position of the overall center of gravity of the robot 1 defined by the desired gait having as its constituent elements the desired body position/posture and the desired leg positions/postures of the respective leg links 3R and 3L.

The desired-gait center-of-gravity ↑Xg_cmd2 is a three-component vector (column vector) having as its constituent elements the coordinate components of the global coordinate system, as is the basic desired center-of-gravity ↑Xg_cmd1.

In the present embodiment, the gait generator 32 further includes a desired joint displacement amount determiner 48, which sequentially determines the desired joint displacement amount as a desired value of the displacement amount of each joint of the robot 1, by using the desired body position/posture and the desired leg positions/postures of the leg links 3R and 3L constituting the desired gait. It is noted that this desired joint displacement amount determiner 48 may be included in the aforesaid joint actuator controller 33.

The gait generator 32 sequentially carries out the processing in the above processors 41 to 48 in a predetermined arithmetic processing cycle, to sequentially determine the desired body position/posture and the desired leg positions/postures of the leg links 3R and 3L as the constituent elements of the desired gait, and also sequentially determine the desired joint displacement amount of each joint corresponding to the desired gait.

A description will now be made of the overall processing in the gait generator 32, including the details of the processing carried out in the processors 41 to 48 in the gait generator 32. In the present embodiment, primarily, the processing in the gait generator 32 will be described by taking the case of generating a desired gait for the robot 1 to move in a walking or running operation as an example.

In each arithmetic processing cycle, first, the gait generator 32 carries out the processing in the desired leg position/posture determiner 41 and the basic desired operation value determiner 42.

In the present embodiment, it is configured such that, whenever a free leg (which is one of the leg links 3R and 3L) comes into contact with the ground, the desired leg position/posture determiner 41 and the basic desired operation value determiner 42 are supplied with the desired landing positions/postures, which are the landing positions and landing postures desired for the feet 18 of the free legs, including the next time's free leg, for a plurality of steps, and the desired landing times, which are the landing times desired therefor. It is noted that a desired duration of time taken by one step (gait cycle) by the robot 1 may be used in place of the desired landing time.

The desired landing position/posture and the desired landing time are determined on the basis of a movement plan of the robot 1 or a move command from a controlling device. The determination processing may of course be carried out in the control processing unit 31, although it may be carried out in a server external to the robot 1.

The desired leg position/posture determiner 41 then determines, in accordance with the desired landing positions/postures and the desired landing times supplied thereto, a desired trajectory of the position and posture of the foot 18 of each leg link 3 (a time series pattern of the desired values of the position and posture of the foot 18) from the position and posture in the state where the foot 18 is in contact with the ground immediately before leaving the floor to the next desired landing position/posture. Further, the desired leg position/posture determiner 41 sequentially determines the desired leg position/posture of each leg link 3 as the instantaneous value of that desired trajectory.

Figure 4:
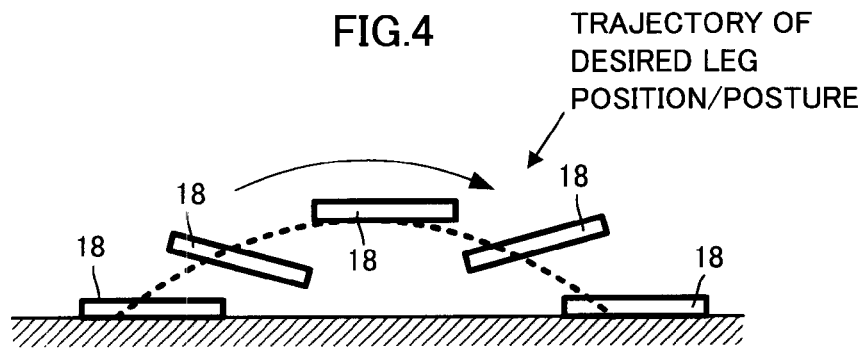
FIG. 4 is a diagram showing, by way of example, a trajectory of the desired leg position/posture determined in a desired leg position/posture determiner shown in FIG. 3.

In this case, the desired trajectory of the position and posture of the foot 18 of a leg link 3 (the trajectory of the desired leg position/posture) is determined such that, during a period in which the leg link 3 functions as a free leg, the foot 18 moves in the air with its desired position and posture changing continuously in a pattern as shown, for example, in FIG. 4. The position and posture of the foot 18 at the beginning of this desired trajectory correspond to the desired landing position/posture at the landing operation before the foot left the floor, and the position and posture of the foot 18 at the end of this desired trajectory correspond to the next desired landing position/posture.

It is noted that while the foot 18 of a leg link 3 is in contact with the ground, the desired trajectory of the position and posture of the leg link 3 may of course be determined such that the position and posture of the foot 18 of the leg link 3 remain unchanged or almost unchanged. Alternatively, the desired trajectory may be determined such that the portion of the foot 18 in contact with the ground shifts from the portion closer to the heel to the portion closer to the tiptoe of the foot 18.

Further, the trajectory of the posture in the air of the foot 18 of a leg link 3 may be determined such that the posture of the foot 18 remains unchanged or almost unchanged.

The basic desired operation value determiner 42 determines a trajectory of a desired ZMP, which is the desired position of the zero moment point (ZMP), in accordance with the desired landing positions/postures and the desired landing times supplied thereto (or in accordance with the trajectory of the desired leg position/posture of each leg link 3 while the foot 18 thereof is in contact with the ground).

In this case, the trajectory of the desired ZMP is set such that the desired ZMP is located in a region (the ZMP existence permissible region) within a so-called supporting polygon and not too close to the boundary thereof, and such that no discontinuous change will occur therein. As a technique of setting such a desired ZMP trajectory, any known technique, including the technique described by the applicant of the present application in Japanese Patent No. 3674789, for example, may be used.

Then, the basic desired operation value determiner 42 uses the time series of the desired leg position/posture determined by the desired leg position/posture determiner 41 and a dynamic model predetermined to represent the dynamics of the robot 1 (the relationship between the external force (herein, the floor reaction force) acting on the robot 1 and the motion of the robot 1), to sequentially determine the position and posture of the body 2 that can satisfy the desired ZMP on the dynamic model, as the aforesaid basic desired body position/posture.

Here, the position and posture of the body 2 that can satisfy the desired ZMP mean the position and posture of the body 2 in accordance with which the components about the horizontal axes (the components about the X and Y axes) of a moment generated about the desired ZMP, due to the resultant force of the gravitational force acting on the robot 1 and the inertial force generated by the motion of the entire robot 1 defined by the time series of the position and posture of the body 2 and the time series of the desired leg positions/postures of the leg links 3R and 3L, become zero on the above-described dynamic model.

As this dynamic model, a dynamic model having high linearity is used such that the position and posture of the body 2 that can satisfy the desired ZMP can be relatively easily calculated. For example, the dynamic model described by the applicant of the present application in Japanese Patent No. 3674789 (the dynamic model shown in FIG. 10 therein) may be used as the dynamic model in the processing in the basic desired operation value determiner 42.

Figure 5:
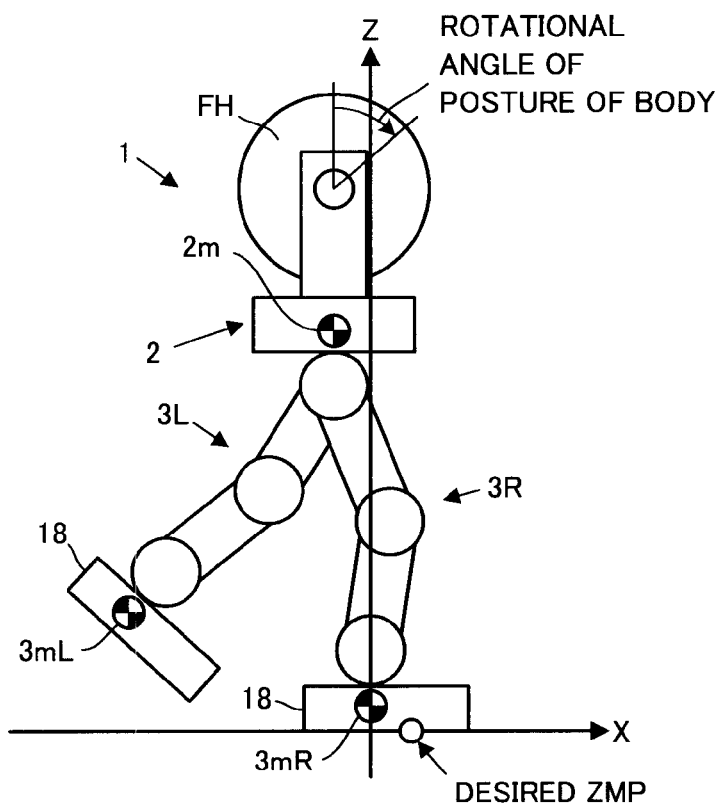
FIG. 5 is a diagram schematically showing the dynamic model used in the processing in a basic desired operation value determiner shown in FIG. 3.

The dynamic model is, as shown in FIG. 5, a model that includes three mass points 3$m$R, 3$m$L, and 2$m$ corresponding respectively to the leg links 3R, 3L and the body 2 (the upper part of the robot 1), and a flywheel FH (having an inertia and no mass) that generates moment of inertia in accordance with the change in posture of the body 2 (in more detail, the postures about the X and Y axes of the lower body 10). In this case, the basic desired body position/posture can be determined by using a technique similar to the technique of determining the desired upper body position/posture described by the applicant of the present application in Japanese Patent No. 3674789.

In this manner, on the above-described dynamic model, the basic desired body position/posture can be determined so as to satisfy a predetermined dynamic restriction condition that the ZMP falls within a supporting polygon and that the frictional force component of the floor reaction force acting on the robot 1 falls within an appropriate permissible range.

It is noted that in the present embodiment, the desired value of the displacement amount of the joint 12 of the body 2 among the basic desired body position/posture is determined for example such that the moment about the vertical axis that is generated about the desired ZMP as the upper body 11 turns about the axis of rotation of the joint 12 cancels the moment about the vertical axis that is generated about the desired ZMP due to the translational motions of the respective mass points 3$m$R, 3$m$L, and 2$m$.

Alternatively, the desired value of the displacement amount of the joint 12 may be a constant value, for example, or it may be set to change periodically in a fixed pattern (in synchronization with the motions of the leg links 3R and 3L).

In the present embodiment, the basic desired operation value determiner 42 further calculates, by using the dynamic model, the position of the overall center of gravity of the robot 1 on the dynamic model, the translational momentum vector of the overall center of gravity, and the angular momentum vector about the overall center of gravity, as the aforesaid basic desired center-of-gravity ↑Xg_cmd1, the basic desired translational momentum vector ↑P_cmd1, and the basic desired angular momentum vector ↑L_cmd1, respectively, on the basis of the time series of the basic desired body position/posture determined as described above and the time series of the desired leg position/posture determined by the desired leg position/posture determiner 41.

In this case, the basic desired center-of-gravity ↑Xg_cmd1 is calculated as the position (position vector) of the overall center of gravity of the mass points 3$m$R, 3$m$L, and 2$m$ defined by the desired leg positions/postures of the leg links 3R and 3L and the basic desired body position/posture in each arithmetic processing cycle. That is, the position vectors of the mass points $3mR$, $3mL$, and $2m$, defined by the desired leg positions/postures of the respective leg links 3R and 3L and the basic desired body position/posture, are multiplied by the mass of the mass points $3mR$, $3mL$, and $2m$. A total sum of the resultant vectors is then divided by the mass of the entire robot 1 (=the mass of the total sum of the mass points $3mR$, $3mL$, and $2m$), to thereby obtain the basic desired center-of-gravity ↑Xg_cmd1.

Further, the basic desired translational momentum vector ↑P_cmd1 is calculated by multiplying the moving velocity vector (=the temporal change rate of ↑Xg_cmd1) of the overall center of gravity of the mass points $3mR$, $3mL$, and $2m$, defined by the time series of the desired leg positions/postures of the leg links 3R and 3L and the time series of the basic desired body position/posture, by the mass of the entire robot 1. That is, the translational momentum vector of the overall center of gravity of the mass points $3mR$, $3mL$, and $2m$ is calculated as the basic desired translational momentum vector ↑P_cmd1.

Further, the basic desired angular momentum vector ↑L_cmd1 is calculated as a total sum of the following angular momentum vectors: the angular momentum vectors that are generated about the overall center of gravity of the mass points $3mR$, $3mL$, and $2m$ by the translational momentum vectors of the respective mass points $3mR$ and $3mL$ defined by the time series of the desired leg positions/postures of the leg links 3R and 3L; the angular momentum vector that is generated about the overall center of gravity of the mass points $3mR$, $3mL$, and $2m$ by the translational momentum vector of the mass point $2m$ defined by the time series of the basic desired body position/posture; the angular momentum vector that is generated by the rotational motion of the flywheel FH defined by the time series of the posture of the body 2 included in the basic desired body position/posture; and the angular momentum vector that is generated by the rotational motion of the upper body 11 relative to the lower body 10 (the rotational motion about the axis of rotation of the joint 12).

Supplementarily, in the case where the robot 1 includes another link, such as an arm link, that is movable relative to the body 2, the basic desired operation value determiner 42 also determines a desired value defining the displacement amount of each joint of the other link (for example, the desired position and desired posture of the distal portion of the other link, or the desired value of the displacement amount of each joint at the distal portion of the other link).

In this case, in the processing of generating a desired gait for the robot 1 to perform a walking or running operation, the desired value defining the displacement amount of each joint of the other link (for example, the arm link) may be, for example, a desired value by which the position and posture of each portion of the other link relative to the upper body 11 of the body 2 are maintained steadily constant. In such a case, the mass of the mass point $2m$ and the inertia (moment of inertia) of the flywheel FH in the dynamic model may be set by taking the effects of the other link into account.

Following the execution of the processing in the desired leg position/posture determiner 41 and the basic desired operation value determiner 42 as described above, next, the gait generator 32 carries out the processing in the desired-gait center-of-gravity calculator 47, and the processing in the basic desired translational momentum corrector 43 and the basic desired body motion velocity determiner 44.

The desired-gait center-of-gravity calculator 47 is supplied with the constituent elements (desired leg position/posture and desired body position/posture) of the desired gait lastly determined in the previous arithmetic processing cycle by the gait generator 32. In other words, the constituent elements of the latest (current) desired gait among the desired gaits already determined by the gait generator 32 are supplied to the desired-gait center-of-gravity calculator 47.

The desired-gait center-of-gravity calculator 47 then calculates the position (position vector as seen in the global coordinate system) of the overall center of gravity of the robot 1, defined by the constituent elements of the desired gait supplied thereto, by geometric computation based on a geometric model (rigid-body link model) of the robot 1, and determines the calculated position as the desired-gait center-of-gravity ↑Xg_cmd2.

In more detail, the geometric model of the robot 1 used in the above geometric computation is, for example, a model in which a mass point is set at the position of center of gravity of each element link of the robot 1, the mass point having the mass of the corresponding element link.

Then, the desired-gait center-of-gravity calculator 47 first calculates, from the latest desired gait supplied thereto, the displacement amount of each joint of the robot 1 defined by that desired gait, by arithmetic processing of inverse kinematics.

Next, the desired-gait center-of-gravity calculator 47 calculates the position of each mass point on the geometric model, defined by the calculated displacement amount of each joint and the desired leg position/posture or the desired body position/posture of the received latest desired gait.

Then, from the position of each mass point calculated as described above and the mass of the mass point, the desired-gait center-of-gravity calculator 47 calculates the position of the overall center of gravity of the robot 1 which is the position of the center of mass of all the mass points on the geometric model. The position of the overall center of gravity of the robot 1 calculated in this manner is determined as the desired-gait center-of-gravity ↑Xg_cmd2.

It is noted that the processing of determining the desired-gait center-of-gravity ↑Xg_cmd2 corresponding to the latest desired gait determined lastly in the previous arithmetic processing cycle of the gait generator 32 by the desired-gait center-of-gravity calculator 47 in the above-described manner may be carried out during the previous arithmetic processing cycle.

Supplementarily, in the case where the robot 1 includes another link, such as an arm link, that is movable relative to the body 2, the desired-gait center-of-gravity ↑Xg_cmd2 may be determined by using a geometric model that takes the mass of the other link into consideration.

In this case, the desired-gait center-of-gravity calculator 47 is supplied with, not only the desired leg positions/postures and the desired body position/posture, but also a desired value defining the displacement amount of each joint of the other link (for example, the desired position and desired posture of the distal portion of the other link, or the desired value of the displacement amount of each joint at the distal portion of the other link).

Then, the desired-gait center-of-gravity ↑Xg_cmd2 as the position of the overall center of gravity of the robot 1 may be calculated by geometric computation based on the geometric model including the mass point corresponding to the other link.

In the case where the mass of the other link is sufficiently small compared to the mass of the body 2, however, the desired-gait center-of-gravity ↑Xg_cmd2 may be determined by using a geometric model in which the mass of the other link is ignored, or by using a geometric model in which the mass of the other link is incorporated into the mass of the body 2.

Further, for example in the case where an arm link is extended from the upper body 11 of the body 2 and the posture of the arm link relative to the upper body 11 is maintained constant or approximately constant during a walking or running operation of the mobile robot 1, the arm link substantially becomes a part of the upper body 11. Thus, in this case, the desired-gait center-of-gravity ↑Xg_cmd2 may be determined by using a geometric model in which the mass of the other link is incorporated into the mass of the upper body 11.

The basic desired translational momentum corrector 43 is sequentially supplied with the basic desired center-of-gravity ↑Xg_cmd1 and the basic desired translational momentum vector ↑P_cmd1 from the basic desired operation value determiner 42, and also sequentially supplied with the desired-gait center-of-gravity ↑Xg_cmd2 from the desired-gait center-of-gravity calculator 47.

In the following description, as to the values of ↑Xg_cmd1, ↑P_cmd1, ↑Xg_cmd2, and other variables determined in the processing in the gait generator 32, when it is necessary to differentiate between the value determined during the current (current time's) arithmetic processing cycle of the gait generator 32 and the value determined during the previous (last time's) arithmetic processing cycle thereof, the former may be referred to as the "current time's value", and the latter may be referred to as the "last time's value".

The basic desired translational momentum corrector 43 first calculates, in an arithmetic section 43a thereof, the deviation between the received basic desired center-of-gravity ↑Xg_cmd1 and the received desired-gait center-of-gravity ↑Xg_cmd2 (=↑Xg_cmd1−↑Xg_cmd2).

In this case, the current time's value of the desired gait corresponding to the current time's value of the basic desired center-of-gravity ↑Xg_cmd1 has not been determined yet. In the present embodiment, the current time's value of the desired-gait center-of-gravity ↑Xg_cmd2 is the position of the overall center of gravity of the robot 1 corresponding to the last time's value of the desired gait. Therefore, in the processing in the arithmetic section 43a, the above-described deviation (hereinafter, referred to as the "center-of-gravity deviation") is calculated by using the last time's value of the basic desired center-of-gravity ↑Xg_cmd1 and the current time's value of the desired-gait center-of-gravity ↑Xg_cmd2.

Further, the basic desired translational momentum corrector 43 carries out, in an arithmetic section 43b thereof, the processing of multiplying the center-of-gravity deviation (=↑Xg_cmd1−↑Xg_cmd2) calculated in the arithmetic section 43a by a gain Kg of a predetermined value. In this manner, a manipulated variable (feedback manipulated variable) for correcting the basic desired translational momentum vector ↑P_cmd1 to cause the above-described deviation to approach zero is calculated.

Next, the basic desired translational momentum corrector 43 carries out, in an arithmetic section 43c thereof, the processing of correcting the current time's value of the basic desired translational momentum vector ↑P_cmd1 by the manipulated variable calculated in the arithmetic section 43b. This correction is carried out by adding the manipulated variable calculated in the arithmetic section 43b to the current time's value of ↑P_cmd1. In this manner, a corrected basic desired translational momentum vector ↑P_cmd2 (current time's value) is calculated as the output of the arithmetic section 43c.

Accordingly, in each arithmetic processing cycle, the corrected basic desired translational momentum vector ↑P_cmd2 (current time's value) is calculated by correcting the current time's value of the basic desired translational momentum vector ↑P_cmd1 in accordance with the following expression (1).

$$\uparrow P\_cmd2 = \uparrow P\_cmd1 + Kg \cdot (\uparrow Xg\_cmd1 - \uparrow Xg\_cmd2) \quad (1)$$

Namely, ↑P_cmd2 is determined by correcting ↑P_cmd1 by the feedback manipulated variable that is determined, in accordance with a scaling law as a feedback control law, to cause the center-of-gravity deviation (↑Xg_cmd1−↑Xg_cmd2) to approach zero.

It is noted that the gain Kg may be either a scholar or diagonal matrix (gain matrix). When the gain Kg is a diagonal matrix, a feedback gain can be set for each component (each of the coordinate axis components of X, Y, and Z axes) of the center-of-gravity deviation.

The basic desired body motion velocity determiner 44 is sequentially supplied with the basic desired body position/posture from the basic desired operation value determiner 42, and also sequentially supplied with the desired body position/posture from the desired body position/posture determiner 46 (which will be described later in detail).

The basic desired body motion velocity determiner 44 first calculates, in an arithmetic section 44a thereof, the deviation between the received basic desired body position/posture and the received desired body position/posture (=basic desired body position/posture−desired body position/posture).

In this case, the desired body position/posture corresponding to the current time's value of the basic desired body position/posture has not been determined yet. Therefore, in the processing in the arithmetic section 44a, the above-described deviation (hereinafter, referred to as the "body position/posture deviation") is calculated by using the last time's value of the basic desired body position/posture and the last time's value of the desired body position/posture.

Further, the basic desired body motion velocity determiner 44 carries out, in an arithmetic section 44b thereof, the processing of multiplying the body position/posture deviation calculated in the arithmetic section 44a by a gain Kb of a predetermined value. In this manner, the basic desired body motion velocity vector ↑Vb_cmd1 configured with the desired values of the change amounts per unit time of the position and posture of the body 2 is calculated as a manipulated variable (feedback manipulated variable) for causing the above-described body position/posture deviation to approach zero to prevent the desired body position/posture from deviating from the basic desired body position/posture.

Accordingly, in each arithmetic processing cycle, the basic desired body motion velocity vector ↑Vb_cmd1 is calculated in accordance with the following expression (2).

$$\uparrow Vb\_cmd1 = Kb \cdot (\text{basic desired body position/posture} - \text{desired body position/posture}) \quad (2)$$

Namely, ↑Vb_cmd1 is determined as the feedback manipulated variable that is determined, in accordance with a scaling law as a feedback control law, to cause the body position/posture deviation (=basic desired body position/posture−desired body position/posture) to approach zero.

It is noted that the gain Kb may be either a scholar or diagonal matrix (gain matrix). When the gain Kb is a diagonal matrix, a feedback gain can be set for each component of the body position/posture deviation (the deviation of the position in each coordinate axis direction of the body 2, the deviation (angular deviation) of the posture about each coordinate axis of the body 2, and the deviation (angular deviation) of the displacement amount of the joint 12 of the body 2).

Following the execution of the processing in the desired-gait center-of-gravity calculator 47, the basic desired translational momentum corrector 43, and the basic desired body motion velocity determiner 44 as described above, next, the gait generator 32 carries out the processing in the desired body motion velocity value determiner 45.

This desired body motion velocity value determiner 45 determines a desired body motion velocity vector ↑Vb_cmd2 as a desired value of the body motion velocity vector ↑Vb by using a Jacobian matrix that represents linear mapping from the body motion velocity vector ↑Vb, having as its components the change amounts per unit time of the position and posture of the body 2, to a control object vector ↑S, composed of the components of the translational momentum vector ↑P of the overall center of gravity of the robot 1, the components of the angular momentum vector ↑L about the overall center of gravity of the robot 1, and the components of the body motion velocity vector ↑Vb.

The control object vector ↑S is a column vector configured with the components of ↑P, ↑L, and ↑Vb. More specifically, when ↑P, ↑L, and ↑Vb are expressed using their components as: ↑P≡[Px, Py, Pz]$^T$, ↑L≡[Lx, Ly, Lz]$^T$, and ↑Vb≡[Vbx, Vby, Vbz, ωbx, ωby, ωbz, ωbt]$^T$ (where the superscript T represents transposition), then ↑S is a column vector expressed by, for example, the following expression (3).

$$\uparrow S = [\uparrow P, \uparrow L, \uparrow Vb]^T = [Px, Py, Pz, Lx, Ly, Lz, Vbx, Vby, Vbz, \omega bx, \omega by, \omega bz, \omega bt]^T \quad (3)$$

It is noted that Px, Py, and Pz are the X-axis component, the Y-axis component, and the Z-axis component, respectively, of ↑P. Lx, Ly, and Lz are the X-axis component, the Y-axis component, and the Z-axis component, respectively, of ↑L. Further, Vbx, Vby, and Vbz are the X-axis component, the Y-axis component, and the Z-axis component, respectively, of the moving velocity of the representative point of the body 2, ωbx, ωy, and ωbz are the angular velocity component about the X axis, the angular velocity component about the Y axis, and the angular velocity component about the Z axis, respectively, of the temporal change rate of the posture of the body 2, and ωbt is the temporal change rate (angular velocity) of the displacement amount of the joint 12 of the body 2.

Further, when the Jacobian matrix representing the linear mapping from ↑Vb to ↑S is represented as "A", the linear mapping is expressed by the following expression (4).

$$\uparrow S = A \cdot \uparrow Vb \quad (4)$$

In this case, the Jacobian matrix A is a matrix, as shown in the following expression (5), in which inertia matrices M and H, representing linear mapping from ↑Vb to ↑P and ↑L, respectively, and a unit matrix E (the order of which is equal to the number of components of ↑Vb), representing linear mapping from ↑Vb to ↑Vb, are arranged vertically. In the present embodiment, ↑Vb is a seven-component vector. Therefore, each of M and H is an inertia matrix with three rows and seven columns, and E is a unit matrix with seven rows and seven columns. Accordingly, in the present embodiment, the Jacobian matrix A is a matrix with 13 rows and seven columns.

$$A = \begin{bmatrix} M \\ H \\ E \end{bmatrix} \quad (5)$$

where $$\uparrow P = M \cdot \uparrow Vb$$

$$\uparrow L = H \cdot \uparrow Vb$$

E: unit matrix

The overall processing in the desired body motion velocity value determiner 45 using the Jacobian matrix A is carried out in the following manner.

In each arithmetic processing cycle, first, the desired body motion velocity value determiner 45 determines the Jacobian matrix A representing the linear mapping in the above expression (4).

Further, the desired body motion velocity value determiner 45 sets a restriction condition regarding ↑Vb (the condition defining the permissible range of each component of ↑Vb or a linear combination value thereof), as a condition for making it possible to satisfy the restriction conditions regarding the displacement amounts (the rotational angles) of the joints of the leg links 3 and the temporal change rates (the angular velocities) thereof.

Then, the desired body motion velocity value determiner 45 calculates the value of ↑Vb that can minimize the value of a predetermined quadratic evaluation function, configured with the body motion velocity vector ↑Vb as a variable, within a range in which the above-described restriction condition regarding ↑Vb is satisfied, in accordance with a known solution method for a quadratic programming problem. Further, the desired body motion velocity value determiner 45 determines the calculated value of ↑Vb as the desired body motion velocity vector ↑Vb_cmd2.

In the processing of determining the desired body motion velocity vector ↑Vb_cmd2 as described above, in the present embodiment, the desired body motion velocity value determiner 45 determines the Jacobian matrix A in the following manner.

First, a description will be made of the precondition regarding the technique of determining the Jacobian matrix A in the present embodiment. The Jacobian matrix A representing the linear mapping in the aforesaid expression (4) is a Jacobian matrix having the inertia matrices M, H and the unit matrix E as its constituent elements, in which M and H are variables.

This Jacobian matrix A may be calculated basically as a matrix which represents the sensitivity of the occurrence of a translational momentum vector ↑P of the overall center of gravity of the robot 1 and an angular momentum vector ↑L about the overall center of gravity that will occur when the components of the position and posture of the body 2 are changed by minute amounts from the motional state as a starting point of the robot 1 that is defined by the current desired gait of the robot 1 (the desired gait determined during the last time's arithmetic processing cycle).

In this case, the translational momentum vector ↑P of the overall center of gravity of the robot 1 and the angular momentum vector ↑L about the overall center of gravity that result from the minute changes of the components of the position and posture of the body 2 from the motional state as the starting point can be calculated by using, for example, a dynamic model in which, for each link of the robot 1, a mass point at the center of gravity thereof and the inertia (moment of inertia) about the center of gravity are set (hereinafter, this dynamic model will be referred to as the "full model"). For the calculation of these vectors, a known technique may be used.

In the present embodiment, however, in order to further enhance the reliability of the desired body motion velocity vector ↑Vb_cmd2 that is to be determined in accordance with a desired control object vector ↑S_cmd, an instantaneous value of a future desired gait (desired leg position/posture and desired body position/posture) within a period (within a duration of one arithmetic processing cycle) between the current time (the time of the current time's arithmetic processing cycle) and the time of the next time's arithmetic processing cycle is estimated. Then, the Jacobian matrix A is determined, with the motional state of the robot 1 defined by the estimated instantaneous value of the future desired gait as the starting point.

In other words, in calculating the Jacobian matrix A, in each arithmetic processing cycle, the motional state of the robot 1 to be used as the starting point for calculation of the Jacobian matrix A is shifted from the motional state defined by the current desired gait toward the motional state expected in the future.

This is for the following reasons. The relationship between the minute changes in position and posture of the body 2 and ↑P and ↑L that result from those changes generally has nonlinearity. Therefore, when a Jacobian matrix A determined by using the state of the robot 1 in the current desired gait as the starting point is used, the resultant ↑Vb_cmd2 may well be deviated from an optimal value for achieving ↑S_cmd.

Figure 6:
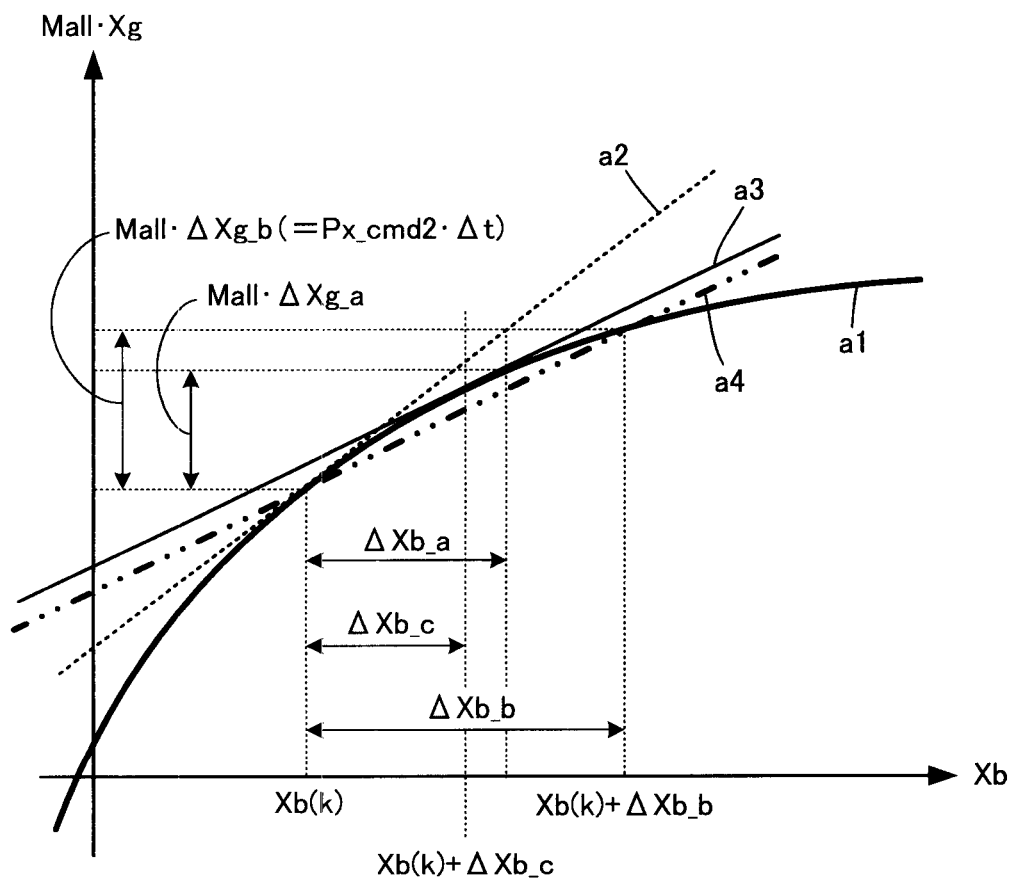
FIG. 6 is a graph illustrating the processing of determining a Jacobian matrix in the processing in a desired body motion velocity value determiner shown in FIG. 3.

For example, when focusing on the relationship between the position Xb of the body 2 when the positions and postures of the feet 18R and 18L of the leg links 3R and 3L are maintained constant and the position Xg of the overall center of gravity of the robot 1 multiplied by the overall mass Mall of the robot 1 (=Mall·Xg), this relationship is generally nonlinear, as shown by a solid curve a1 in FIG. 6.

Here, for the convenience of understanding, Xb and Xg are positions in one of the X, Y, and Z axis directions in the global coordinate system, for example the positions in the X axis direction. In this case, Mall·Xg is a state quantity corresponding to the integral of the translational momentum in the X axis direction of the overall center of gravity of the robot 1.

In the case where the current position of the body 2 in the current desired gait is Xb(k) shown in FIG. 6, for example, in the Jacobian matrix A determined by using the state of the current desired gait as the starting point (hereinafter, this will be referred to as the "basic Jacobian matrix A1"), the relationship between the minute change of Xb and the change of Mall·Xg corresponding thereto is expressed as a linear relationship shown by a tangent a2 to the curve a1 at the position Xb(k).

Therefore, when the desired body motion velocity vector ↑Vb_cmd2 corresponding to the desired control object vector ↑S_cmd is determined by using the basic Jacobian matrix A1, the desired change amount of the position Xb of the body 2 during the time Δt for one cycle of arithmetic processing (one arithmetic processing cycle) of the gait generator 32 becomes ΔXb_a shown in FIG. 6.

This ΔXb_a is a value obtained by multiplying, by Δt, the value of the component Vbx, corresponding to the temporal change rate of the position Xb, in ↑Vb_cmd2 determined by using the basic Jacobian matrix A1 as described above. In other words, assuming that the relationship between the position Xb of the body 2 and Mall·Xg is as represented by the above-described tangent a2, ΔXb_a is the change amount of Xb in accordance with which the change amount of Mall·Xg corresponding to ΔXb_a takes a value obtained by multiplying the desired value Px_cmd2 of the translational momentum in the X axis direction, in ↑P_cmd2 as a constituent element of the desired control object vector ↑S_cmd, by Δt (=Px_cmd2·Δt).

However, when the actual relationship between the position Xb of the body 2 and Mall·Xg is the relationship represented by the curve a1, then the actual change amount of Mall·Xg corresponding to ΔXb_a becomes Mall·ΔXg_a in FIG. 6. This value Mall·ΔXg_a generally causes an error with respect to the above-described value Px_cmd2·Δt which is the desired value of the change amount of Mall·Xg defined by the desired control object vector ↑S_cmd.

When the actual relationship between the position Xb of the body 2 and Mall·Xg is the relationship represented by the curve a1, an appropriate change amount of the position Xb of the body 2 for making the change amount of Mall·Xg take the desired value Px_cmd2·Δt of the change amount of Mall·Xg defined by the desired control object vector ↑S_cmd is ΔXb_b (≠ΔXb_a) shown in FIG. 6.

Meanwhile, when an intermediate position Xb(k)+ΔXb_c (0<ΔXb_c<ΔXb_b) is assumed between the position Xb(k) of the body 2 in the current desired gait and the position Xb(k)+ΔXb_b shifted from the position Xb(k) by the above-described amount ΔXb_b, the slope of a tangent a3 to the curve a1 at the intermediate position Xb(k)+ΔXb_c can be made to agree with, or approximate to, the slope of a straight line a4 that connects the point on the curve a1 at the position Xb(k) and the point on the curve a1 at the position Xb(k)+ΔXb_b, on the basis of the mean value theorem in calculus.

Therefore, when a future desired gait that makes the position Xb of the body 2 coincide with the intermediate position Xb(k)+ΔXb_c is used as the starting point to determine the Jacobian matrix A, and when this Jacobian matrix A is used to determine ↑Vb_cmd2, then the change amount of the position Xb of the body 2 defined by this ↑Vb_cmd2 can be made to agree with the above-described appropriate change amount ΔXb_b, or take a value having high approximation accuracy to the change amount ΔXb_b. That is, it is possible to enhance the reliability of ↑Vb_cmd2.

The above description applies, not only to the component of ↑Vb_cmd2 that affects ↑P_cmd2 in ↑S_cmd, but also to the component of ↑Vb_cmd2 that affects ↑L_cmd1.

Thus, in the present embodiment, as described previously, an instantaneous value of a future desired gait (desired leg position/posture and desired body position/posture) within the period (within the duration of one arithmetic processing cycle) from the current time (the time of the current time's arithmetic processing cycle) to the time of the next time's arithmetic processing cycle is estimated. Then, the Jacobian matrix A is determined by setting the motional state of the robot 1 defined by the estimated instantaneous value of the future desired gait as the starting point.

In this case, in the present embodiment, the instantaneous values of the desired leg position/posture and the desired body position/posture (hereinafter, referred to as the "Jacobian-matrix-determining desired leg position/posture" and the "Jacobian-matrix-determining desired body position/posture") as the constituent elements of the future desired gait (hereinafter, referred to as the "Jacobian-matrix-determining desired gait") that defines the motional state set as the starting point for determining the Jacobian matrix A are determined in the following manner.

The desired body motion velocity value determiner 45 determines the Jacobian-matrix-determining desired body position/posture in a manner as expressed by the following expression (7a). Specifically, the deviation between the current desired body position/posture (the desired body position/posture determined in the last time's arithmetic processing cycle; hereinafter referred to as the "desired body position/posture (k)") and the desired body position/posture one arithmetic processing cycle before (the desired body position/posture determined in the last but one time's arithmetic processing cycle; hereinafter referred to as the "desired body position/posture (k−1)"), i.e. the change amount of the desired body position/posture determined in the last time's arithmetic processing cycle (=desired body position/posture (k)−desired body position/posture (k−1)), is multiplied by a coefficient Kp of a predetermined value to obtain a correction term, and this correction term is added to the desired body position/posture (k), to thereby determine the Jacobian-matrix-determining desired body position/posture.

Similarly, the desired body motion velocity value determiner 45 determines the Jacobian-matrix-determining desired leg position/posture in a manner as expressed by the following expression (7b). Specifically, for each leg link 3, the deviation between the current desired leg position/posture (the desired leg position/posture determined in the last time's arithmetic processing cycle; hereinafter referred to as the "desired leg position/posture (k)") and the desired leg position/posture one arithmetic processing cycle before (the desired leg position/posture determined in the last but one time's arithmetic processing cycle; hereinafter referred to as the "desired leg position/posture (k−1)"), i.e. the change amount of the desired leg position/posture determined in the last time's arithmetic processing cycle (=desired leg position/posture (k)−desired leg position/posture (k−1)), is multiplied by the coefficient Kp to obtain a correction term, and this correction term is added to the desired leg position/posture (k), to thereby determine the Jacobian-matrix-determining desired leg position/posture.

It is noted that the coefficient Kp is a value predetermined in the range of $0 \leq Kp \leq 1$. In the present embodiment, Kp=0.5, for example.

Jacobian-matrix-determining desired body position/
posture=desired body position/posture (k)+Kp·
(desired body position/posture (k)−desired body
position/posture (k−1))       (7a)

Jacobian-matrix-determining desired leg position/
posture=desired leg position/posture (k)+Kp·
(desired leg position/posture (k)−desired leg
position/posture (k−1))       (7b)

Accordingly, in the present embodiment, the Jacobian-matrix-determining desired gait is determined as a gait that is obtained by correcting the current desired gait in accordance with the latest value in the time series of the change amount of the desired gait for each arithmetic processing cycle of the gait generator 32.

It is noted that in the case where the robot 1 includes another link, such as an arm link, that is movable relative to the body 2, the desired position and desired posture of the distal portion of the other link in the future or the desired displacement amount of each joint of the other link in the future may be obtained in the same manner as the Jacobian-matrix-determining desired body position/posture and the Jacobian-matrix-determining desired leg position/posture.

Further, the Jacobian-matrix-determining desired gait may be determined from the desired gaits for three or more arithmetic processing cycles, including the current desired gait and the desired gait one arithmetic processing cycle before.

Then, the desired body motion velocity value determiner 45 uses the aforesaid full model to calculate the Jacobian matrix A as a matrix which represents the sensitivity of the occurrence of the translational momentum vector ↑P of the overall center of gravity of the robot 1 and the angular momentum vector ↑L about the overall center of gravity that will occur when the components of the position and posture of the body 2 are changed by minute amounts from the state, as the starting point, in the Jacobian-matrix-determining desired gait determined as described above. The calculation of the Jacobian matrix may be carried out in a known manner.

It is noted that the dynamic model used for calculating the Jacobian matrix A may be a dynamic model different from the aforesaid full model; it may be, for example, a dynamic model that ignores inertia of one or more links. However, it is desirable to use a dynamic model having the dynamic accuracy as high as possible (a dynamic model having the dynamic accuracy higher than that of the dynamic model used in the processing in the aforesaid basic desired operation value determiner 42). Herein, that the dynamic accuracy is high means that the approximation accuracy of the total inertial force produced on the dynamic model by the motion of the robot 1 to the total inertial force produced in the actual robot 1 is high.

The above has described the details of the processing of determining the Jacobian matrix A carried out in the desired body motion velocity value determiner 45.

Next, the restriction condition regarding the body motion velocity vector ↑Vb (hereinafter, referred to as the "body motion velocity restriction condition") is set in the following manner.

First, a description will be made of the precondition regarding the technique of setting the body motion velocity restriction condition in the present embodiment. The values of the displacement amounts (rotational angles) of joints and the temporal change rates (angular velocities) thereof that can be implemented by the robot 1 are generally subject to restrictions due to the constructions of the joints or the joint driving mechanisms (the joint actuators 30 and the power transmission mechanisms), or the capabilities of the joint actuators 30 and so on. Thus, the displacement amounts of the joints of the robot 1 or the temporal change rates thereof (hereinafter, referred to as the "joint velocities") are not able to, or not allowed to, take values beyond certain variable ranges corresponding thereto.

Further, the changes in position and posture of the body 2 (excluding the displacement amount of the joint 12 of the body 2) are made in accordance with the changes in displacement amount of the joints of each leg link 3. Therefore, the desired value of the body motion velocity vector ↑Vb (the desired body motion velocity vector ↑Vb_cmd2) needs to be set such that the displacement amounts and joint velocities of the joints of each leg link 3 defined by the desired gait ultimately determined in each arithmetic processing cycle of the gait generator 32 fall within the variable ranges corresponding thereto.

The above-described body motion velocity restriction condition is, therefore, the condition for restricting the values of the components of the body motion velocity vector ↑Vb to prevent the displacement amounts and joint velocities of the joints of each leg link 3 from going beyond the variable ranges thereof.

Meanwhile, in the present embodiment, the desired body motion velocity value determiner 45 determines the value of ↑Vb that minimizes the value of a predetermined evaluation function (which will be described later in detail) within the range in which the above-described body motion velocity restriction condition can be satisfied, as the desired body motion velocity vector ↑Vb_cmd2.

In this case, if the body motion velocity restriction condition is the restriction condition represented by one or more linear matrix inequalities related to ↑Vb, i.e. one or more linear matrix inequalities in the form of C·↑Vb+↑c≥↑0 or C·↑Vb+↑c≤↑0, then the desired body motion velocity vector ↑Vb_cmd2 can be determined by arithmetic processing adapting a known solution method for a quadratic programming problem.

It is noted that C in the above linear matrix inequalities is a matrix corresponding to the coefficient of ↑Vb, ↑c is a vector corresponding to a constant term, and ↑0 is a null vector. Further, the inequality sign (≥ or ≤) in the above linear matrix inequalities indicates the magnitude relationship between the vector on the left side and the vector on the right side for each component.

Thus, in the present embodiment, the body motion velocity restriction condition for restricting the value of each component of ↑Vb is set in the form of the linear matrix inequality having ↑Vb as a variable.

Here, of the leg links 3R and 3L of the robot 1, a given leg link 3R or 3L will be collectively referred to as the "leg link 3_i", and a leg-distal-portion motion velocity vector which is the vector having as its components the temporal change rates of the position and posture of the foot 18 which is an element link constituting the distal portion of that leg link 3_i will be denoted by "↑Vft_i".

In more detail, ↑Vft_i is a six-component column vector configured with the components of the temporal change rate of the position of the foot 18 (i.e. the translational motion velocity vector of the representative point of the foot 18) of the leg link 3_i as seen in the global coordinate system, and the components of the temporal change rate of the posture of the foot 18 (i.e. the rotational angular velocity vector of the posture of the foot 18 of the leg link 3_i) of the leg link 3_i as seen in the global coordinate system.

Further, a leg joint velocity vector which is the vector having as its components the joint velocities of the respective joints of the leg link 3_i will be denoted by "↑ωleg_i", and a Jacobian matrix representing the linear mapping from this ↑ωleg_i to the leg-distal-portion motion velocity vector ↑Vft_i will be denoted by "Jleg_i".

In the present embodiment, ↑ωleg_i is a six-component vector, because the leg link 3_i has six joints. The Jacobian matrix Jleg_i is a regular matrix with six rows and six columns.

Further, a relative position vector (three-component vector in the global coordinate system) of the representative point of the foot 18 of the leg link 3_i relative to the representative point of the body 2 (more precisely, the lower body 10) will be denoted by "↑r_bf_i".

At this time, the relationship between the body motion velocity vector ↑Vb and the above-described ↑Vft_i and ↑ωleg_i is expressed by the following expression (8).

$$\uparrow Vft\_i = B\_i \cdot \uparrow Vb + Jleg\_i \cdot \uparrow \omega leg\_i \tag{8}$$

where $$B\_i \cdot \uparrow Vb = \begin{bmatrix} E & D\_i & 0 \\ 0 & E & 0 \end{bmatrix} \cdot \uparrow Vb$$

$$= \begin{bmatrix} E & D\_i & 0 \\ 0 & E & 0 \end{bmatrix} \cdot \begin{bmatrix} Vbx \\ Vby \\ Vbz \\ \omega bx \\ \omega by \\ \omega bz \\ \omega bt \end{bmatrix}$$

E: unit matrix (3 rows and 3 columns)
D_i: matrix (3 rows and 3 columns) satisfying $$D\_i \cdot \begin{bmatrix} \omega bx \\ \omega by \\ \omega bz \end{bmatrix} = -\uparrow r\_bf\_i \times \begin{bmatrix} \omega bx \\ \omega by \\ \omega bz \end{bmatrix}$$

It is noted that "×" is an algebraic sign representing the exterior product (vector product). Further, in the matrix B_i shown in the "where" clause following the expression (8), "0" (beneath "E") on the first column is a zero matrix with three rows and three columns, and "0" on the first and second rows on the third column are each a zero matrix (null vector) with three rows and one column.

The first term on the right side of the expression (8) indicates the translational motion velocity and rotational angular velocity of the foot 18 of the leg link 3_i that occur when the body 2 is moved at the motion velocity of ↑Vb with the displacement amount of each joint of the leg link 3_i being kept constant. Further, the second term on the right side of the expression (8) indicates the translational motion velocity and rotational angular velocity of the foot 18 of the leg link 3_i that occur when each joint of the leg link 3_i is moved at the joint velocity of each component of ↑ωleg_i with the position and posture of the body 2 being kept constant.

From the above expression (8), the following expression (9) is derived.

$$\uparrow \omega leg\_i = C\_i \cdot \uparrow Vb + \uparrow c\_i \tag{9}$$

$$\text{where } C\_i \equiv -(Jleg\_i)^{-1} \cdot B\_i \tag{9a}$$

$$\uparrow c\_i \equiv (Jleg\_i)^{-1} \cdot \uparrow Vft\_i \tag{9b}$$

Therefore, the restriction condition that restricts the value of the leg joint velocity vector ↑ωleg_i can be converted to the restriction condition regarding the body motion velocity vector ↑Vb by the expression (9).

More specifically, a vector having as its components the lower limits of the permissible ranges of the respective components of the leg joint velocity vector ↑ωleg_i of the leg link 3_i will be denoted by "↑ωleg_i_min", and a vector having as its components the upper limits of the permissible ranges of the respective components of ↑ωleg_i will be denoted by "↑ωleg_i_max". At this time, the restriction condition for causing the values of the respective components of the leg joint velocity vector ↑ωleg_i to fall within the permissible ranges thereof is represented by the following two linear matrix inequalities (10a) and (10b) on the basis of the expression (9).

$$C\_i \cdot \uparrow Vb + (\uparrow c\_i - \uparrow \omega leg\_i\_min) \geq \uparrow 0 \tag{10a}$$

$$-C\_i \cdot \uparrow Vb + (-\uparrow c\_i + \uparrow \omega leg\_i\_max) \geq \uparrow 0 \tag{10b}$$

Therefore, in the present embodiment, the above linear matrix inequalities (10a) and (10b) for each of the leg links 3R and 3L are set to represent the body motion velocity restriction condition. In this case, ↑ωleg_i_min and ↑ωleg_i_max among the parameters in the linear matrix inequalities (10a) and (10b) are set such that, when ↑Vb is determined to satisfy the body motion velocity restriction condition represented by the above linear matrix inequalities (10a) and (10b) for each leg link 3 (to make the linear matrix inequalities (10a) and (10b) hold), the displacement amounts and joint velocities of the joints of each leg link 3 will fall within the variable ranges thereof.

In the present embodiment, there are two leg links 3R and 3L. Therefore, the body motion velocity restriction condition is represented by a total of four linear matrix inequalities (with two linear matrix inequalities for each leg link 3).

Supplementarily, the above expressions (10a) and (10b) correspond respectively to the aforesaid expressions (100a) and (100b). In this case, C_i, ↑Vb, ↑c_i, ↑ωleg_i_min, and ↑ωleg_i_max in the expressions (10a) and (10b) correspond respectively to C_i, ↑Vs, ↑c_i, ↑ω_i_min, and ↑ω_i_max in the aforesaid expressions (100a) and (100b). Further, ↑Vft_i, B_i, Jleg_i, and ↑ωleg_i in the aforesaid expression (8) correspond respectively to ↑Vft_i, B_i, J_i, and ↑ω_i defined in the "where" clause following the aforesaid expressions (100a) and (100b).

With the above precondition in mind, a description will now be made of the processing of setting the body motion velocity restriction condition carried out in the desired body motion velocity value determiner 45.

The above-described linear matrix inequalities (10a) and (10b) representing the body motion velocity restriction condition in the present embodiment are the linear matrix inequalities having $\uparrow Vb$ as a variable. Therefore, to set the body motion velocity restriction condition means to determine the values of the parameters other than $\uparrow Vb$ in those linear matrix inequalities (10a) and (10b), i.e. the matrix $C\_i$ defined by the aforesaid expression (9a), the vector $\uparrow c\_i$ defined by the aforesaid expression (9b), and $\uparrow \omega leg\_i\_min$ and $\uparrow \omega leg\_i\_max$.

The desired body motion velocity value determiner 45 determines the values of $C\_i$, $\uparrow c\_i$, $\uparrow \omega leg\_i\_min$, and $\uparrow \omega leg\_i\_max$ for each of the leg links 3R and 3L, in each arithmetic processing cycle of the gait generator 32, in the following manner. As the way of determining the values of $C\_i$, $\uparrow c\_i$, $\uparrow \omega leg\_i\_min$, and $\uparrow \omega leg\_i\_max$ is the same for both leg links 3R and 3L, in the following, the processing of determining $C\_i$, $\uparrow c\_i$, $\uparrow \omega leg\_i\_min$, and $\uparrow \omega leg\_i\_max$ for the right leg link 3R will be described representatively.

First, in order to determine $C\_i$ and $\uparrow c\_i$ in accordance with their definitional expressions (9a) and (9b) above, $(Jleg\_i)^{-1}$, $B\_i$, and $\uparrow Vft\_i$ are determined.

As to $(Jleg\_i)^{-1}$, in the present embodiment, the desired body motion velocity value determiner 45 first determines a Jacobian matrix $Jleg\_i$ for the leg link 3R by using as the starting point the motional state of the robot 1 defined in a Jacobian-matrix-determining desired gait which is the desired gait expected in the future, as in the case of determining the Jacobian matrix A representing the linear mapping in the aforesaid expression (4).

In this case, the Jacobian-matrix-determining desired gait is the same as the one obtained for calculating the aforesaid Jacobian matrix A. The desired body motion velocity value determiner 45 uses the geometric model of the robot 1 to calculate the Jacobian matrix $Jleg\_i$ as a matrix which represents the sensitivity of the change in position and posture of the foot 18 of the leg link 3R that will occur when the displacement amounts of the respective joints of the leg link 3R are changed by minute amounts from the motional state as the starting point of the robot 1 that is defined by the Jacobian-matrix-determining desired gait. The calculation of the Jacobian matrix may be carried out in a known manner.

Further, the desired body motion velocity value determiner 45 calculates an inverse matrix of the calculated Jacobian matrix $Jleg\_i$. In this manner, $(Jleg\_i)^{-1}$ for the leg link 3R is determined.

As to $B\_i$, as apparent from the "where" clause following the aforesaid expression (9), the matrix $B\_i$ is defined by the relative position vector $\uparrow r\_bf\_i$ of the foot 18 of the leg link 3R with respect to the lower body 10. In this case, the relative position vector $\uparrow r\_bf\_i$ of the foot 18 of the leg link 3R with respect to the lower body 10 is calculated as a vector that is obtained by subtracting the position vector of the body 2 in the desired gait determined in the last time's arithmetic processing cycle (this coincides with the position vector of the lower body 10 in the present embodiment) from the position vector of the foot 18 of the leg link 3R in that desired gait.

Then, the desired body motion velocity value determiner 45 calculates a matrix representing the exterior product of $\uparrow r\_bf\_i$ calculated in the above-described manner and the angular velocity vector $[\omega bx, \omega by, \omega bz]^T$ of the posture of the body 2 (lower body 10) $(=\uparrow r\_bf\_ix[\omega bx, \omega by, \omega bz]^T)$ as $B\_i$.

As to $\uparrow Vft\_i$, the desired body motion velocity value determiner 45 calculates a difference vector between the desired leg position/posture (current time's value) of the leg link 3R determined by the desired leg position/posture determiner 41 in the current time's arithmetic processing cycle and the desired leg position/posture (last time's value) of the leg link 3R determined by the desired leg position/posture determiner 41 in the last time's arithmetic processing cycle, and divides the difference vector by the period of the arithmetic processing cycle. The desired body motion velocity value determiner 45 determines the resultant vector as $\uparrow Vft\_i$.

Then, from $(Jleg\_i)^{-1}$, $B\_i$, and $\uparrow Vft\_i$ calculated as described above, the desired body motion velocity value determiner 45 determines $C\_i$ and $\uparrow c\_i$ regarding the leg link 3R in accordance with the definitional expressions (9a) and (9b) above.

As to $\uparrow \omega leg\_i\_min$ and $\uparrow \omega leg\_i\_max$, the desired body motion velocity value determiner 45 determines the upper and lower limits of the joint velocities of the respective joints of the leg link 3R as the components of the leg joint velocity vector $\uparrow \omega leg\_i$, in accordance with the displacement amounts of the respective joints of the leg link 3R defined by the desired gait (the latest desired gait) ultimately determined in the last time's arithmetic processing cycle. Then, the desired body motion velocity value determiner 45 determines $\uparrow \omega leg\_i\_min$ as a vector having the lower limits as its components, and $\uparrow \omega leg\_i\_max$ as a vector having the upper limits as its components.

In this case, the upper and lower limits of the joint velocity of each joint of the leg link 3R are determined such that the joint velocity falls within the variable range defined in accordance with the capability of the joint actuator 30 and so on, and such that the displacement amount of that joint does not go beyond the variable range defined by the structural restrictions and so on.

Figure 7:
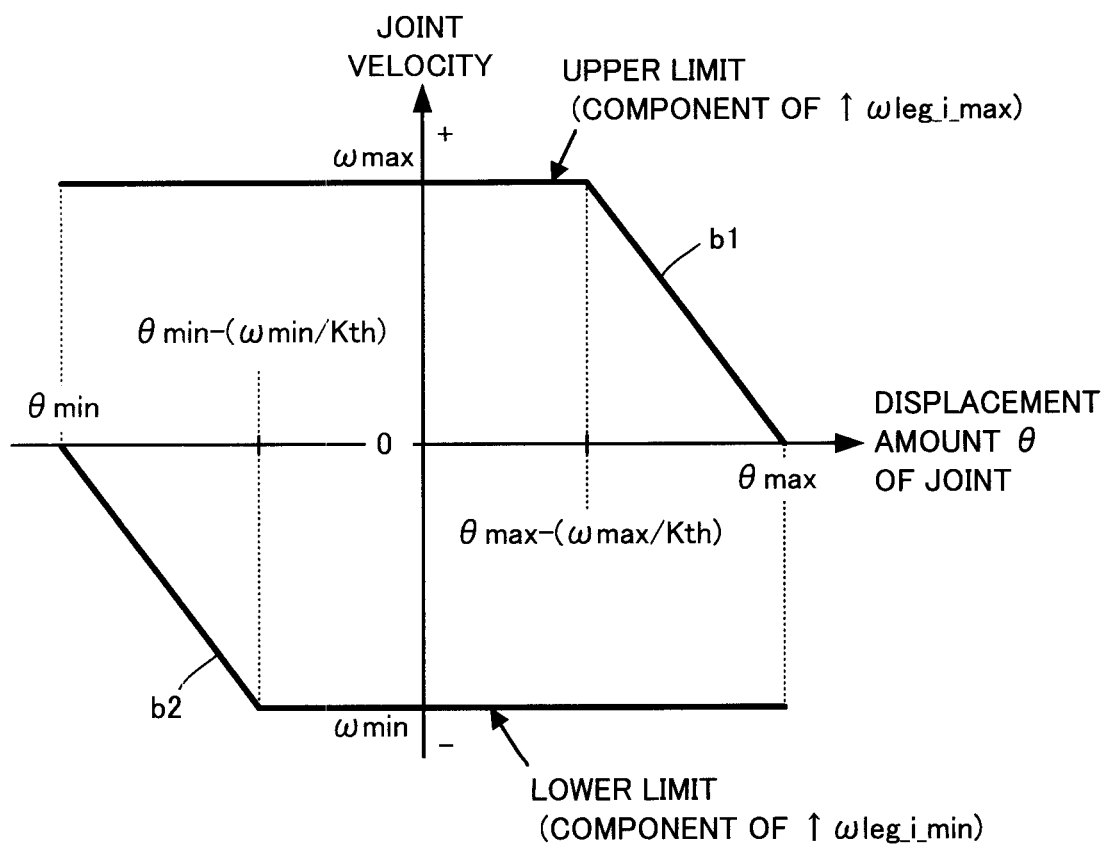
FIG. 7 is a graph illustrating the processing of setting upper and lower limits of the permissible range of the joint velocity in the first embodiment, among the processing in the desired body motion velocity value determiner shown in FIG. 3.

More specifically, in the present embodiment, for each joint of the leg link 3R, the desired body motion velocity value determiner 45 determines the upper and lower limits of the joint velocity thereof, as respectively shown by graphs b1 and b2 in FIG. 7, in accordance with the displacement amount $\theta$ of that joint defined by the latest desired gait (or in accordance with the last time's value of the desired displacement amount of that joint determined by the desired joint displacement amount determiner 48).

In this case, the upper limit of the joint velocity of each joint is determined in accordance with the displacement amount $\theta$ of that joint, as shown in the following expressions (11a) and (11b). Similarly, the lower limit of the joint velocity of each joint is determined in accordance with the displacement amount $\theta$ of that joint, as shown in the following expressions (12a) and (12b).

$$\text{When } \theta < \theta\max - (\omega\max/K\text{th}) \text{ (when } K\text{th} \cdot (\theta\max - \theta) > \omega\max\text{): Upper limit of joint velocity} = \omega\max \quad (11a)$$

$$\text{When } \theta \geq \theta\max - (\omega\max/K\text{th}) \text{ (when } K\text{th} \cdot (\theta\max - \theta) \leq \omega\max\text{): Upper limit of joint velocity} = K\text{th} \cdot (\theta\max - \theta) \quad (11b)$$

$$\text{When } \theta > \theta\min - (\omega\min/K\text{th}) \text{ (when } K\text{th} \cdot (\theta\min - \theta) < \omega\min\text{): Lower limit of joint velocity} = \omega\min \quad (12a)$$

$$\text{When } \theta \leq \theta\min - (\omega\min/K\text{th}) \text{ (when } K\text{th} \cdot (\theta\min - \theta) \geq \omega\min\text{): Lower limit of joint velocity} = K\text{th} \cdot (\theta\min - \theta) \quad (12b)$$

In the above expressions (11a), (11b), (12a), and (12b), $\theta\max$ and $\theta\min$ are the upper and lower limits, respectively, of the variable range of the displacement amount θ of the joint (the variable range based on the structural restrictions of the joint).

Further, ωmax and ωmin are the upper and lower limits, respectively, of the variable range of the joint velocity of the joint (the variable range based on the restrictions including the capability of the joint actuator 30), or, in other words, the variable range of the joint velocity of the joint provided that there is no restriction on the displacement amount θ of the joint. It is noted that ωmax is the velocity in the direction of increasing the displacement amount θ of the joint from the θmin side to the θmax side (in the present embodiment, ωmax>0), and ωmin is the velocity in the direction of decreasing the displacement amount θ of the joint from the θmax side to the θmin side (in the present embodiment, ωmin<0).

Further, Kth is a coefficient that defines the degree of decrease in magnitude of the joint velocity in the case where the displacement amount θ of the joint approaches the upper limit θmax or the lower limit θmin (in the present embodiment, Kth>0).

The above-described θmax, θmin, ωmax, ωmin, and Kth take values predetermined for each joint of the leg link 3R. While Kth in the expression (11b) and Kth in the expression (12b) are set to the same value in the present embodiment, they may be set to different values.

With the upper and lower limits of the joint velocity of each joint of the leg link 3R determined in the above-described manner, when the displacement amount θ of the joint defined by the latest desired gait becomes close to the upper limit θmax, the upper limit of the joint velocity of that joint is restricted to a value lower than the original upper limit ωmax. When the displacement amount θ of the joint has reached the upper limit θmax, the upper limit of the joint velocity of that joint is made to be zero. This prevents the displacement amount θ of the joint from becoming larger than θmax.

Similarly, when the displacement amount θ of the joint becomes close to the lower limit θmin, the magnitude of the lower limit of the joint velocity of that joint is restricted to a value smaller in magnitude than the original lower limit ωmin. When the displacement amount θ of the joint has reached the lower limit θmin, the lower limit of the joint velocity of that joint is made to be zero. This prevents the displacement amount θ of the joint from becoming lower than θmin.

Therefore, by determining the upper and lower limits of the joint velocity of each joint of the leg link 3R in the above-described manner, the upper and lower limits of the joint are ultimately determined such that the displacement amount of each joint of the leg link 3R falls within the variable range between the upper limit θmax and the lower limit θmin and such that the joint velocity of the joint falls within the variable range between the original upper limit ωmax and the lower limit ωmin.

The details as to how the desired body motion velocity value determiner 45 determines the parameters $C\_i$, $\uparrow c\_i$, $\uparrow \omega leg\_i\_min$, and $\uparrow \omega leg\_i\_max$ defining the linear matrix inequalities regarding the leg link 3R have been described above. The processing of determining the parameters $C\_i$, $\uparrow c\_i$, $\uparrow \omega leg\_i\_min$, and $\uparrow \omega leg\_i\_max$ defining the linear matrix inequalities regarding the leg link 3L is carried out in the same manner. Accordingly, the linear matrix inequalities (10a) and (10b) above for the respective leg links 3R and 3L are set to represent the body motion velocity restriction condition.

The above has described the details of the processing carried out in the desired body motion velocity value determiner 45 for setting the body motion velocity restriction condition (or in more detail, the processing of determining the parameters $C\_i$, $\uparrow c\_i$, $\uparrow \omega leg\_i\_min$, and $\uparrow \omega leg\_i\_max$ defining the linear matrix inequalities regarding the respective leg links 3R and 3L).

Following the execution of the processing of determining the Jacobian matrix A and the processing of setting the body motion velocity restriction condition as described above, next, the desired body motion velocity value determiner 45 carries out the processing of determining the desired body motion velocity vector $\uparrow Vb\_cmd2$ in the following manner.

As described previously, the desired body motion velocity value determiner 45 calculates the value of the body motion velocity vector $\uparrow Vb$ that can minimize the value of a predetermined quadratic evaluation function having $\uparrow b$ as a variable, within a range in which the body motion velocity restriction condition can be satisfied, in accordance with a known solution method for a quadratic programming problem. The desired body motion velocity value determiner 45 then determines the calculated value of $\uparrow b$ as the desired body motion velocity vector $\uparrow Vb\_cmd2$.

In this case, the quadratic evaluation function having $\uparrow b$ as a variable is a function that is predetermined to include a term that takes a minimum value when the value of $A \cdot \uparrow Vb$ (the value of the right side of the aforesaid expression (4)) coincides with the value of the desired control object vector $\uparrow S\_cmd$. As such an evaluation function, the function expressed by the following expression (13a) or (13b), for example, can be used. In the expressions, W and V are weighting matrices (diagonal matrices).

$$f1 = (\uparrow S\_cmd - A \cdot \uparrow Vb)^T \cdot V \cdot (\uparrow S\_cmd - A \cdot \downarrow Vb) \qquad (13a)$$

$$f2 = (\uparrow Vb)^T \cdot W \cdot \uparrow Vb + (\uparrow S\_cmd - A \cdot \uparrow Vb)^T \cdot V \cdot (\uparrow S\_cmd - A \cdot \uparrow Vb) \qquad (13b)$$

The evaluation function f1 expressed by the expression (13a) is a function configured with a term obtained by linearly combining the square values of the respective components of the difference vector of $\uparrow S\_cmd$ and $A \cdot \uparrow Vb$, with the diagonal components of the weighting matrix V as the weighting factors. In other words, this evaluation function f1 is the function representing the magnitude of the weighted mean of the square values of the respective components of the difference vector of $\uparrow S\_cmd$ and $A \cdot \uparrow Vb$. The evaluation function f1 takes a minimum value (=zero) when $\uparrow S\_cmd = A \cdot \uparrow Vb$.

Therefore, when $\uparrow Vb$ is determined so as to minimize the value of this evaluation function f1, $\uparrow Vb$ can be determined to make the components of $A \cdot \uparrow Vb$ coincide with, or nearly coincide with, the components of $\uparrow S\_cmd$.

Further, the evaluation function f2 expressed by the expression (13b) is a function in which a term (the first term on the right side of the expression (13b)) obtained by linearly combining the square values of the respective components of $\uparrow Vb$, with the diagonal components of the weighting matrix W as the weighting factors, is added to the term (the second term on the right side of the expression (13b)) that is the same term as the one constituting the evaluation function f1 expressed by the aforesaid expression (13a).

The first term on the right side of the expression (13b) as the constituent element of this evaluation function f2 is, in other words, the function representing the magnitude of the weighted mean of the square values of the respective components of $\uparrow Vb$. This first term takes a minimum value (=zero) when $\uparrow Vb = \uparrow 0$.

Therefore, when $\uparrow Vb$ is determined so as to minimize the value of this evaluation function f2, $\uparrow Vb$ can be determined such that the components of $A \cdot \uparrow Vb$ coincide with, or nearly coincide with, the components of ↑S_cmd as much as possible, while preventing the magnitude of each component of ↑Vb from becoming too large (i.e., preventing the magnitude of the change amount per unit time of the position and/or posture of the body 2 from becoming too large).

It is noted that the weighting matrix W in the evaluation function f2 may be a zero matrix. In this case, the evaluation function f2 becomes identical to the evaluation function f1 in the expression (13a).

For determination of the desired body motion velocity vector ↑Vb_cmd2, either one of the above-described functions f1 and f2 may be used. In the present embodiment, the aforesaid basic desired body motion velocity vector ↑Vb_cmd1 is used as the reference target of the desired body motion velocity vector ↑Vb_cmd2. Thus, in the present embodiment, the evaluation function f1 in the expression (13a) is used as the evaluation function for use in determining ↑Vb_cmd2.

In this case, as the Jacobian matrix A in the evaluation function f1, the Jacobian matrix calculated as described above by using the motional state of the robot 1 defined by the Jacobian-matrix-determining desired gait as the starting point is used.

Further, the weighting matrix V is a matrix of the same order (13 in the present embodiment) as the desired control object vector ↑S_cmd, and has diagonal components of predetermined values. Basically, the values of the diagonal components (weighting factors) of this weighting matrix V may be set in accordance with the level of error tolerance for the value of each component of the control object vector ↑S, calculated by A·↑Vb_cmd2, relative to the desired value defined by the desired control object vector ↑S_cmd.

In the present embodiment, the values of the diagonal components of the weighting matrix V were set by classifying the diagonal components for example as follows: the (six) diagonal components corresponding to the desired value of the translational momentum vector ↑P (=↑P_cmd2) and the desired value of the angular momentum vector ↑L (=↑L_cmd1) in the desired control object vector ↑S_cmd; of the desired value of the body motion velocity vector ↑Vb (=↑Vb_cmd) in ↑S_cmd, the (six) diagonal components corresponding to the components excluding the desired value of the displacement amount of the joint 12 (i.e., the desired values of the position and posture of the lower body 10); and the (one) diagonal component corresponding to the desired value of the displacement amount of the joint 12.

As an example, the weighting matrix V was set in the following manner. The values of the six diagonal components corresponding to the desired value of the translational momentum vector ↑P and the desired value of the angular momentum vector ↑L were set to 1.0, the values of the six diagonal components corresponding to the desired values of the position and posture of the lower body 10 were set to 0.5, and the value of the diagonal component corresponding to the desired value of the displacement amount of the joint 12 of the body 2 was set to 0.1.

Then, in the present embodiment, the desired body motion velocity value determiner 45 calculates the value of ↑Vb that can minimize the value of the evaluation function f1 in the expression (13a) within the range in which the body motion velocity restriction condition can be satisfied (within the range in which the linear matrix inequalities of the above expressions (10a) and (10b) for each leg link 3R, 3L hold), by arithmetic processing according to a known solution method for a quadratic programming problem. The desired body motion velocity value determiner 45 then determines the calculated value of ↑Vb as the desired body motion velocity vector ↑Vb_cmd2.

In this case, as the solution method for a quadratic programming problem, an interior-point-convex algorithm or a trust-region-reflective algorithm, for example, is used.

In this manner, in each arithmetic processing cycle of the gait generator 32, the desired body motion velocity vector ↑Vb_cmd2 is determined such that the value of A·↑Vb_cmd2 coincides with, or nearly coincides with, the desired control object vector ↑S_cmd as much as possible, within the range in which the body motion velocity restriction condition for causing the displacement amounts and joint velocities of the joints of each leg link 3R, 3L to fall within the variable ranges thereof can be satisfied.

Further, in this case, ↑S_cmd includes, not only the corrected basic desired translational momentum vector ↑P_cmd2 and the basic desired angular momentum vector ↑L_cmd1, but also the basic desired body motion velocity vector ↑Vb_cmd1 which is the manipulated variable for causing the aforesaid body position/posture deviation to approach zero. Therefore, ↑Vb_cmd2 is determined such that the translational momentum vector ↑P and the angular momentum vector ↑L of A·↑Vb_cmd2 coincide respectively with the corrected basic desired translational momentum vector ↑P_cmd2 and the basic desired angular momentum vector ↑L_cmd1 as much as possible, while preventing ↑Vb_cmd2 from deviating from ↑Vb_cmd1.

The above has described the details of the processing in the desired body motion velocity value determiner 45 according to the present embodiment.

Following the execution of the processing in the desired body motion velocity value determiner 45 as described above, next, the gait generator 32 carries out the processing in the desired body position/posture determiner 46.

This desired body position/posture determiner 46 sequentially integrates the desired body motion velocity vector ↑Vb_cmd2 determined by the desired body motion velocity value determiner 45, to thereby determine the desired body position/posture.

More specifically, in each arithmetic processing cycle, the desired body position/posture determiner 46 multiplies the current time's value of the desired body motion velocity vector ↑Vb_cmd2 by the time Δt of the arithmetic processing cycle of the gait generator 32, and adds the resultant value (=↑Vb_cmd2·Δt) to the value of the current desired body position/posture (the value determined in the last time's arithmetic processing cycle), to thereby determine the current time's value of the desired body position/posture.

In the present embodiment, in each arithmetic processing cycle of the gait generator 32, the desired body position/posture (current time's value) determined by the desired body position/posture determiner 46 in the above-described manner and the desired leg position/posture (current time's value) for each link 3 determined by the aforesaid desired leg position/posture determiner 41 are set to be the constituent elements of the desired gait (current time's value).

In the present embodiment, the gait generator 32 further carries out the processing in the desired joint displacement amount determiner 48. In each arithmetic processing cycle, the desired joint displacement amount determiner 48 is supplied with the determined values of the constituent elements of the desired gait (i.e. the desired body position/posture and the desired leg position/posture).

The desired joint displacement amount determiner 48 then calculates the desired joint displacement amount of each joint of the robot 1 defined by the desired gait supplied thereto, by arithmetic processing of inverse kinematics based on the geometric model (rigid-body link model) of the robot 1. In this case, the geometric model of the robot 1 is the same as the one used in the aforesaid desired-gait center-of-gravity calculator 47.

It is noted that in the aforesaid desired-gait center-of-gravity calculator 47, the desired-gait center-of-gravity ↑Xg_cmd2 may be determined using the desired joint displacement amount (last time's value) of each joint determined in the desired joint displacement amount determiner 48, in place of the desired gait (desired body position/posture and desired leg position/posture). In such a case, the processing of calculating the displacement amount of each joint defined by the desired gait in the desired-gait center-of-gravity calculator 47 is unnecessary.

Supplementarily, in the case where the robot 1 includes another link, such as an arm link, that is movable relative to the body 2, the constituent element related to the other link in the desired gait of the robot 1 may be determined as appropriate in, for example, the basic desired operation value determiner 42. As an example, in the case where the robot 1 includes an arm link extended from the upper body 11, in the processing of generating a desired gait for the robot 1 to perform a walking or running operation, a desired gait for the arm link that makes the overall posture of the arm link relative to the upper body 11 in the desired gait (and hence the displacement amount of each joint of the arm link) constant, or a desired gait for the arm link that makes the entire arm link move periodically about the axis of rotation of the joint 12 of the body 2, may be adopted.

The above has described the details of the processing in the gait generator 32 according to the present embodiment.

Here, the correspondence between the above-described embodiment and the invention of the present application will be described supplementarily. In the present embodiment, the control processing unit 31 includes the gait generator 32, so that the control processing unit 31 has the functions as the gait generating device or the operational target generating device of the present invention.

The body 2 of the robot 1 corresponds to the particular site in the gait generating device or the operational target generating device of the present invention. Further, each leg link 3 of the robot 1 corresponds to the leg link in the gait generating device of the present invention, and also corresponds to the link mechanism in the operational target generating device of the present invention.

Further, the desired leg position/posture determiner 41 in the gait generator 32 implements the desired leg position/posture determining unit in the gait generating device of the present invention or the desired link-mechanism distal-portion position/posture determining unit in the operational target generating device of the present invention.

Further, the processing in the desired body motion velocity value determiner 45 and the desired body position/posture determiner 46 in the gait generator 32 respectively implement the desired particular-site motion velocity value determining unit and the desired particular-site position/posture determining unit in the gait generating device or the operational target generating device of the present invention.

In this case, in the present embodiment, the desired body motion velocity value determiner 45 also carries out the processing of determining the Jacobian matrix A. Therefore, the desired body motion velocity value determiner 45 also includes the function as the Jacobian matrix determining unit in the gait generating device or the operational target generating device of the present invention.

Further, the processing in the basic desired operation value determiner 42, the basic desired translational momentum corrector 43, the basic desired body motion velocity determiner 44, and the desired-gait center-of-gravity calculator 47 of the gait generator 32 respectively implement the basic desired operation value determining unit, the basic desired translational momentum correcting unit, the basic desired body motion velocity determining unit, and the desired-gait center-of-gravity calculating unit in the gait generating device of the present invention.

Further, the overall processing in the basic desired operation value determiner 42, the basic desired translational momentum corrector 43, and the basic desired body motion velocity determiner 44 implements the desired control object vector determining unit in the gait generating device or the operational target generating device of the present invention.

According to the present embodiment as described above, the desired body motion velocity value determiner 45 determines the value of the body motion velocity vector ↑Vb that can minimize the value of the evaluation function f1 of the expression (13a) within the range in which the body motion velocity restriction condition expressed by the linear matrix inequalities of the above expressions (10a) and (10b) for each of the leg links 3R and 3L can be satisfied, as the desired body motion velocity vector ↑Vb_cmd2. The ↑Vb_cmd2 is then integrated, so that the desired body position/posture in the desired gait is determined.

In this case, the linear matrix inequalities of the above expressions (10a) and (10b) are set in the above-described manner in accordance with the joint operation restriction conditions that restrict the displacement amounts and joint velocities of the joints in the leg links 3R and 3L. Therefore, when the value of ↑Vb is determined within the range in which the body motion velocity restriction condition expressed by these linear matrix inequalities can be satisfied, ↑Vb and, in turn, the desired body position/posture can be determined sequentially such that the joint operation restriction conditions of the joints of the leg links 3R and 3L are satisfied (such that the displacement amounts and joint velocities of those joints fall within the variable ranges thereof).

It is thus possible to sequentially determine the desired body motion velocity vector ↑Vb_cmd2 such that ↑Vb_cmd2 tracks a value appropriate for achieving the desired control object vector ↑S_cmd (the value with which A·↑Vb_cmd2 agrees with, or nearly agrees with, ↑S_cmd) as much as possible, while satisfying the joint operation restriction conditions for the joints in the leg links 3R and 3L, without the need to sequentially check the time series of the determined desired body position/posture to see whether the joint operation restriction conditions are being satisfied.

Further, the corrected basic desired translational momentum vector ↑P_cmd2, which is to be set as a desired value for the translational momentum vector ↑P among the constituent elements of the desired control object vector ↑S_cmd which is the primary target for determining ↑Vb_cmd2, is determined by setting the basic desired translational momentum vector ↑P_cmd1 determined in the basic desired operation value determiner 42 as a reference target, and by correcting this basic desired translational momentum vector ↑P_cmd1 by a feedback manipulated variable for restricting the desired-gait center-of-gravity ↑Xg_cmd2 from deviating from the basic desired center-of-gravity ↑Xg_cmd1 determined in the basic desired operation value determiner 42.

Further, as a desired value for the angular momentum vector ↑L among the constituent elements of the desired control object vector ↑S_cmd, the basic desired angular momentum vector ↑L_cmd1 determined in the basic desired operation value determiner 42 is set.

Further, the basic desired body motion velocity vector ↑Vb_cmd1, which is to be set as a desired value for the body motion velocity vector ↑Vb among the constituent elements of the desired control object vector ↑S_cmd, is determined as the feedback manipulated variable for restricting the desired body position/posture in the desired gait from deviating from the basic desired body position/posture determined in the basic desired operation value determiner 42.

Accordingly, the desired body motion velocity vector ↑Vb_cmd2 to be sequentially determined in the desired body motion velocity value determiner 45 is determined such that the desired body position/posture determined by integrating the desired body motion velocity vector ↑Vb_cmd2 will not deviate from the basic desired body position/posture determined in the basic desired operation value determiner 42, while securing, as much as possible, the dynamics configured to be satisfied on the dynamic model in the processing in the basic desired operation value determiner 42.

Therefore, according to the present embodiment, it is possible to generate a desired gait that meets the joint operation restriction conditions of each leg link 3 as well as the requirements in terms of dynamics, without making the robot 1 lose its balance.

Further, in the processing in the desired body motion velocity value determiner 45, in consideration of the nonlinearity between the position and posture of the body 2 of the robot 1 and the state quantity corresponding to the integral of the translational momentum vector of the overall center of gravity of the robot 1 and the state quantity corresponding to the integral of the angular momentum vector about the overall center of gravity, the Jacobian matrix A is determined by using as the starting point the aforesaid Jacobian-matrix-determining desired gait which is an estimated value of a future desired gait. This can enhance the reliability of the desired body motion velocity vector ↑Vb_cmd2 which is determined as the value of the body motion velocity vector ↑Vb that can minimize the value of the aforesaid evaluation function f1.

In other words, it is possible to improve the degree of coincidence of the value of the control object vector ↑S, obtained by multiplying ↑Vb_cmd2 by the determined Jacobian matrix A, with the desired control object vector ↑S_cmd.

Therefore, according to the present embodiment, it is possible to generate a desired gait that ensures stable and continuous movement of the robot 1, while appropriately reflecting the joint operation restriction conditions of each leg link 3.

A description will now be made of the verification results of the above-described effects of the present embodiment, with reference to FIGS. 8 to 11.

Figure 8A:
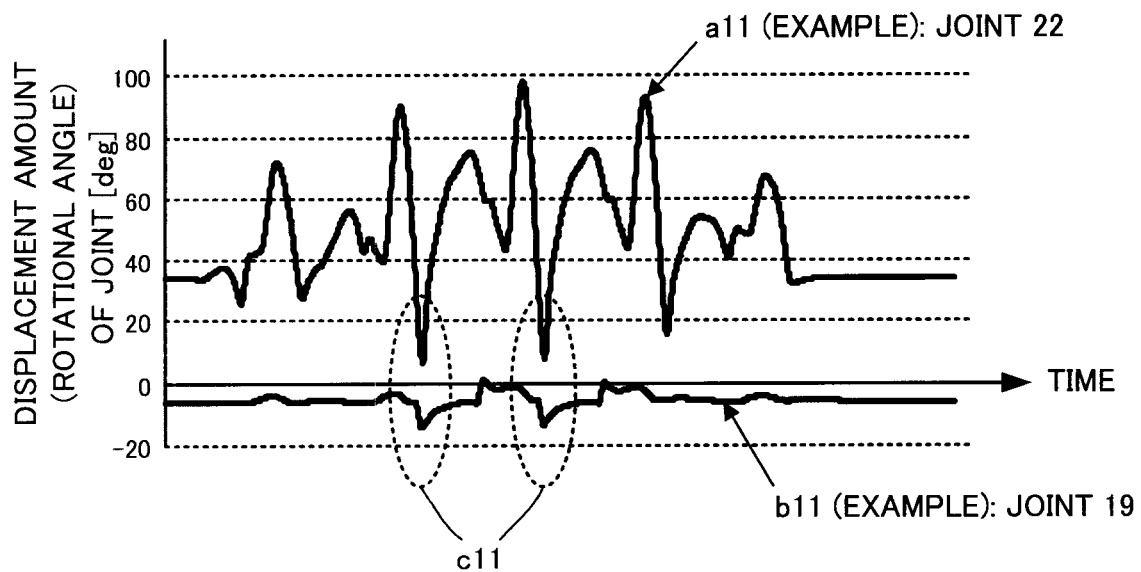
FIGS. 8(*a*) and 8(*b*) are graphs showing, by way of example, time-dependent changes of the displacement amount of a particular joint in the robot in the Example and Comparative Example, respectively.
Figure 8B:
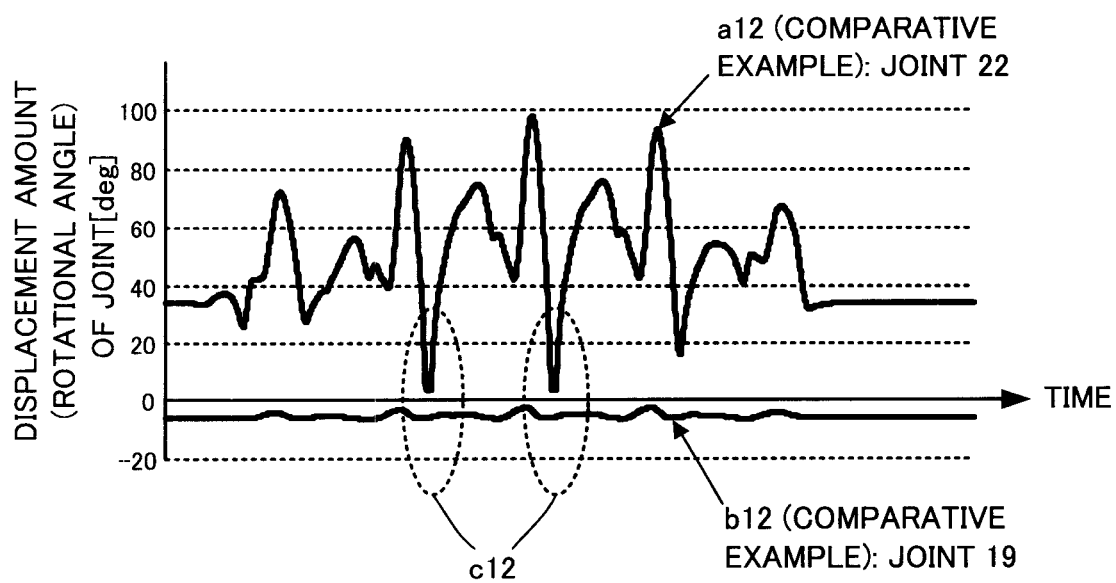

FIG. 8(*a*) includes graphs a11 and b11 which respectively show a time-dependent change in displacement amount (rotational angle) of the joint 22 in the knee joint 15 of one leg link 3 selected from the leg links 3R and 3L of the robot 1, and a time-dependent change in displacement amount (rotational angle) of the joint 19 in the hip joint 13 of that leg link 3, defined by the desired gait generated in an Example of the present embodiment. In this case, the desired gait of the robot 1 is a gait for causing the robot 1 to walk with a stride (of 600 mm, for example) that is longer than in normal walking.

Further, FIG. 8(*b*) includes graphs a12 and b12 which respectively show a time-dependent change in displacement amount (rotational angle) of the joint 22 in the knee joint 15 of one leg link 3 (on the same side as the one in FIG. 8(*a*)) selected from the leg links 3R and 3L of the robot 1, and a time-dependent change in displacement amount (rotational angle) of the joint 19 in the hip joint 13 of that leg link 3, defined by a desired gait generated in a Comparative Example.

In this case, the desired gait of the robot 1 in the Comparative Example is a gait for causing the robot 1 to walk with the same stride (of 600 mm) as in the Example in FIG. 8(*a*).

In this Comparative Example, however, a pseudo inverse matrix $A^+$ of the Jacobian matrix A that can minimize the value of the aforesaid evaluation function f1 was calculated, without applying the restrictions by the aforesaid linear matrix inequalities (10a) and (10b). Further, in this Comparative Example, the value of ↑Vb calculated by multiplying the desired control object vector ↑S_cmd by the pseudo inverse matrix $A^+$ was determined as the desired body motion velocity vector ↑Vb_cmd2. It is noted that the pseudo inverse matrix $A^+$ is a matrix that is calculated, for example, from the Jacobian matrix A and the aforesaid weighting matrix V by: $A^+ = (A^T \cdot V^{-1} \cdot A)^{-1} \cdot A^T \cdot V^{-1}$.

In the Comparative Example in FIG. 8(*b*) with no restrictions by the aforesaid linear matrix inequalities (10a) and (10b), the displacement amount of the joint 22 in the knee joint 15 of the leg link 3 defined by the desired gait had reached the lower limit of the variable range thereof, as shown in dotted circle frames c12 in the figure. This resulted in a gait in which the knee joint 15 of that leg link 3 was stretched to the full extent.

In contrast, in the Example shown in FIG. 8(*a*), the displacement amount (about the yaw axis) of the joint 19 in the hip joint 13 of the leg link 3 defined by the desired gait changed greater than in the Comparative Example, as shown in dotted circle frames c11 in the figure. Thus, it was possible to generate a gait in which the displacement amount of the joint 22 in the knee joint 15 of the leg link 3 was kept within the variable range thereof, or, in which the knee joint 15 of the leg link 3 was not stretched to the full extent.

As described above, according to the above embodiment, the desired body motion velocity vector ↑Vb_cmd2 is determined taking into consideration the restrictions by the aforesaid linear matrix inequalities (10a) and (10b), so that a gait can be generated in which the displacement amounts of the joints in each leg link 3 are prevented from going beyond the variable ranges thereof.

Next, a graph a13 in FIG. 9(*a*) shows a time-dependent change of the angle of inclination of the lower body 10 about the Y axis (pitch axis), as part of the desired body position/posture in the Example in the present embodiment. In this case, the desired gait of the robot 1 is a gait for causing the robot 1 to walk with a maximum stride of 400 mm, for example. Further, in the basic desired body position/posture in this Example, the posture of the lower body 10 about the Y axis (pitch axis) is 0 deg.

Further, a graph a14 in FIG. 9(*b*) shows a time-dependent change of the angle of inclination of the lower body 10 about the Y axis (pitch axis), as part of the desired body position/posture in the Comparative Example.

In this case, the desired gait of the robot 1 in the Comparative Example is a gait for causing the robot 1 to walk with a maximum stride of 400 mm, as in the Example in FIG. 9(*a*). Further, in the basic desired body position/posture in this Comparative Example, the posture of the lower body 10 about the Y axis (pitch axis) is 0 deg, as in the Example in FIG. 9(*a*).

In this Comparative Example, however, the desired control object vector was configured with the corrected basic desired translational momentum vector ↑P_cmd2 and the basic desired angular momentum vector ↑L_cmd1, with the basic desired body motion velocity vector ↑Vb_cmd1 being excluded from the desired control object vector.

Figure 9A:
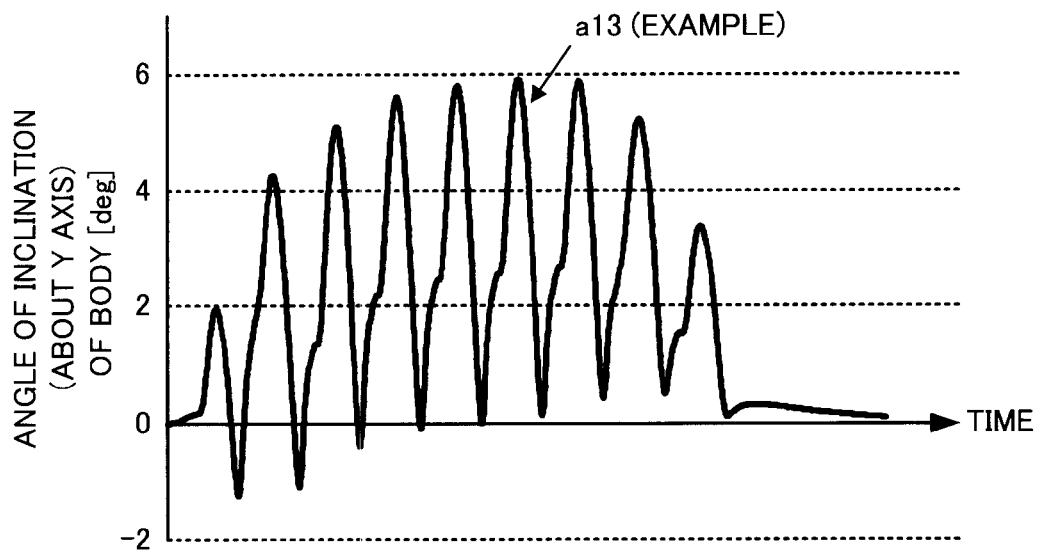
FIGS. 9(*a*) and 9(*b*) are graphs showing, by way of example, time-dependent changes of the posture (the angle of inclination) of the body of the robot in the Example and Comparative Example, respectively.
Figure 9B:
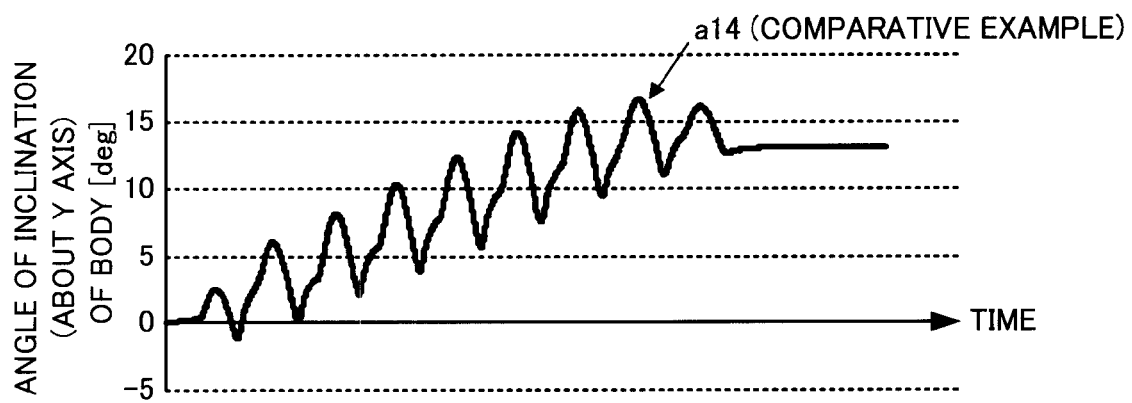

As seen from FIG. 9(b), in the Comparative Example in which the basic desired body motion velocity vector ↑Vb_cmd1 is not included as the constituent element of the desired control object vector ↑S_cmd, the desired body position/posture ultimately suffered a steady deviation of about 13 deg with respect to the basic desired body position/posture (=0 deg).

In contrast, in the Example in which the basic desired body motion velocity vector ↑Vb_cmd1 is included as the constituent element of the desired control object vector ↑S_cmd, it was possible to eliminate a steady deviation of the desired body position/posture from the basic desired body position/posture, as shown in FIG. 9(a).

It is thus apparent that according to the present embodiment in which the basic desired body motion velocity vector ↑Vb_cmd1 is included as the constituent element of the desired control object vector ↑S_cmd, compared to the case where the basic desired body motion velocity vector ↑Vb_cmd1 is not included in the desired control object vector ↑S_cmd, the desired body position/posture can be made to track the basic desired body position/posture, without largely deviating therefrom.

Figure 10A:
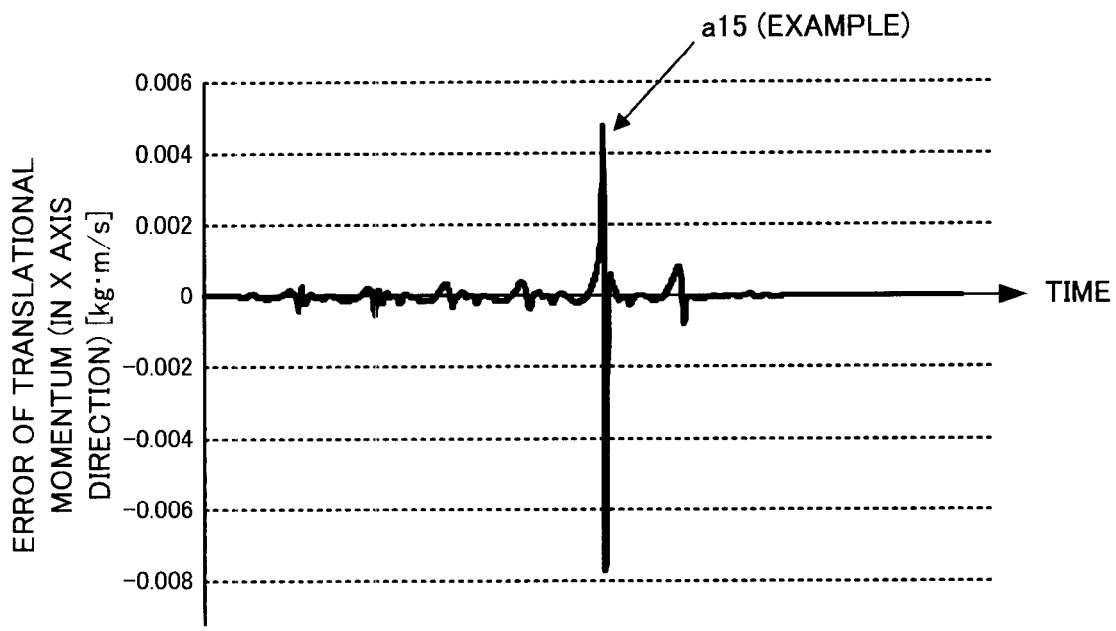
FIGS. 10(*a*) and 10(*b*) are graphs showing, by way of example, time-dependent changes of the error in translational momentum of the overall center of gravity of the robot in the Example and Comparative Example, respectively.
Figure 11A:
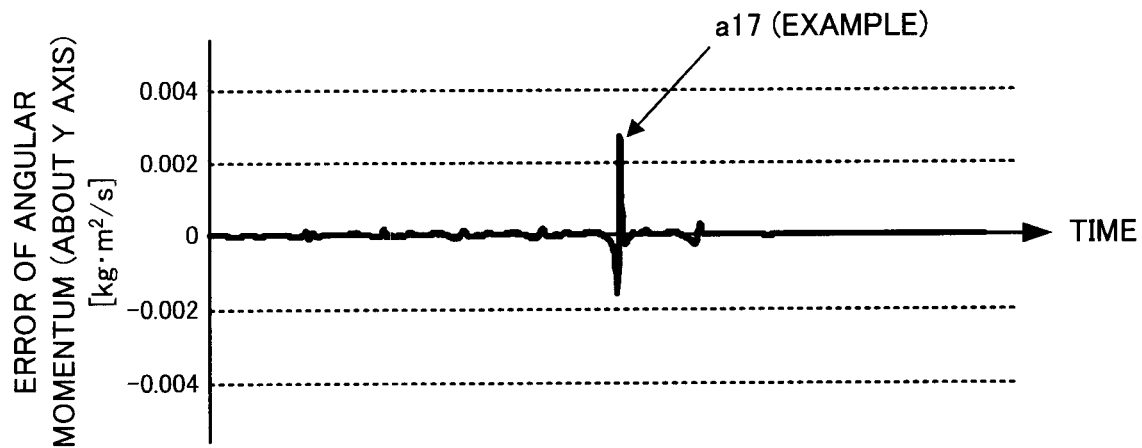
FIGS. 11(*a*) and 11(*b*) are graphs showing, by way of example, time-dependent changes of the error in angular momentum about the overall center of gravity of the robot in the Example and Comparative Example, respectively.

FIGS. 10(a) and 11(a) include graphs a15 and a17 which respectively show time-dependent changes of the error of the translational momentum in the X axis direction of the overall center of gravity of the robot 1 defined by the desired gait generated in the Example of the present embodiment (i.e. the error relative to the X-axis component of the basic desired translational momentum vector ↑P_cmd1), and the error of the angular momentum about the Y axis (pitch axis) at the overall center of gravity of the robot 1 defined by the same desired gait (i.e. the error relative to the Y-axis component of the basic desired angular momentum vector ↑L_cmd1). In this case, the desired gait of the robot 1 is a gait for causing the robot 1 to walk with a maximum stride of 355 mm, for example.

Figure 10B:
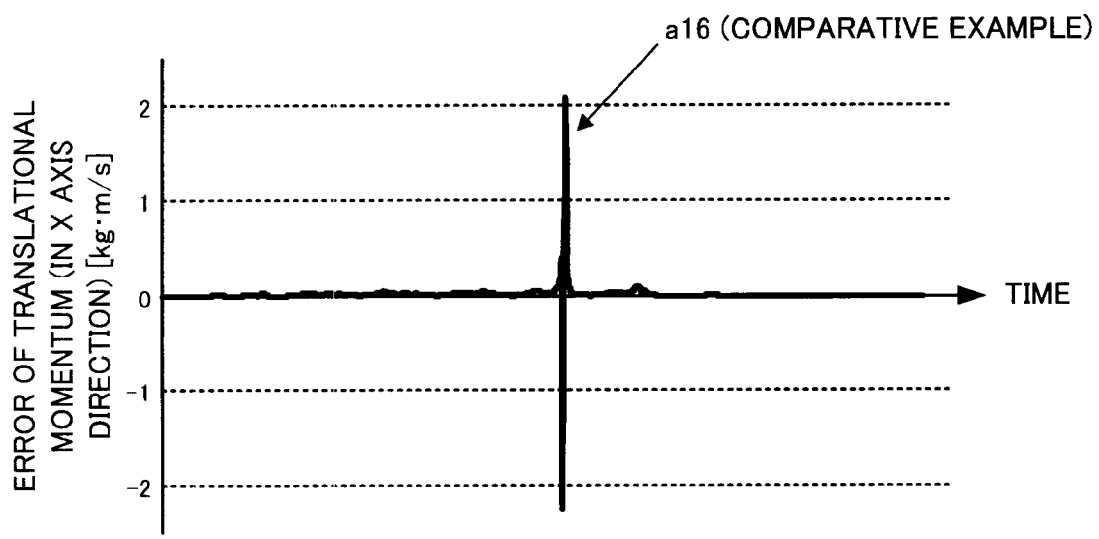
Figure 11B:
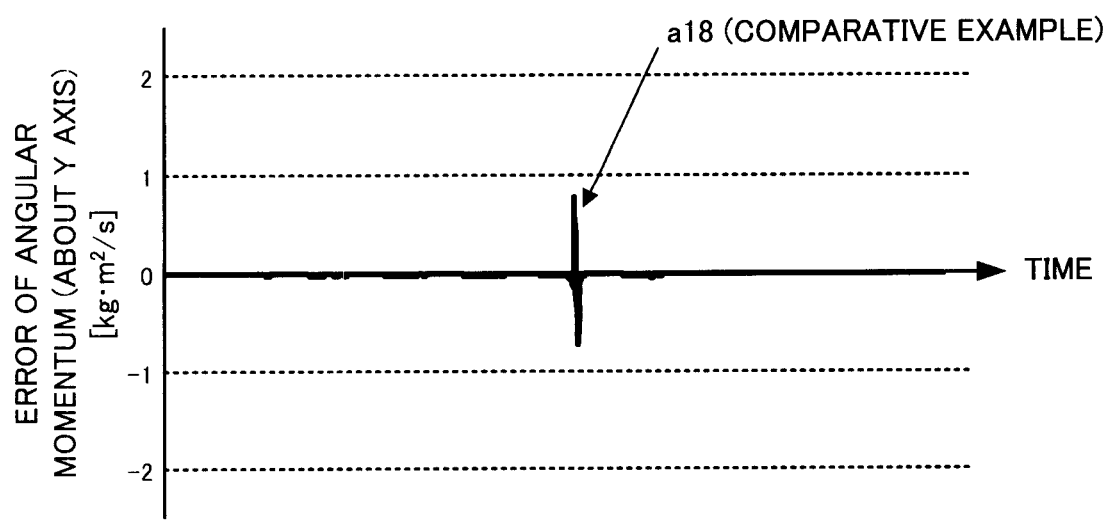

Further, FIGS. 10(b) and 11(b) include graphs a16 and a18 which respectively show time-dependent changes of the error of the translational momentum in the X axis direction of the overall center of gravity of the robot 1 defined by the desired gait generated in the Comparative Example (i.e. the error relative to the X-axis component of the basic desired translational momentum vector ↑P_cmd1), and the error of the angular momentum about the Y axis (pitch axis) at the overall center of gravity of the robot 1 defined by the same desired gait (i.e. the error relative to the Y-axis component of the basic desired angular momentum vector ↑L_cmd1).

In the Comparative Example in FIGS. 10(b) and 11(b), however, the motional state of the robot 1 to be used as the starting point for calculating the Jacobian matrix A in each arithmetic processing cycle was the motional state defined by the desired gait determined in the last time's arithmetic processing cycle (i.e. the latest one of the already determined desired gaits), which was different from the case of the Example in FIGS. 10(a) and 11(a).

In the Example in FIGS. 10(a) and 11(a) and the Comparative Example in FIGS. 10(b) and 11(b), for the purposes of clarifying the effects resulting from the differences in the processing of determining the Jacobian matrix A, the aforesaid corrected basic desired translational momentum vector ↑P_cmd2, as a constituent element of the desired control object vector ↑S_cmd, was made to coincide with the basic desired translational momentum vector ↑P_cmd1.

As seen in the graph a16 in FIG. 10(b), in the Comparative Example, the absolute value of the error of the translational momentum (in the X axis direction) of the overall center of gravity of the robot 1 was about 2.3 kg·m/s at maximum. In contrast, as seen in the graph a15 in FIG. 10(a), in the Example, the absolute value of the error of the translational momentum (in the X axis direction) of the overall center of gravity of the robot 1 was not greater than 0.008 kg·m/s at maximum.

Further, as seen in the graph a1b in FIG. 11(b), in the Comparative Example, the absolute value of the error of the angular momentum (about the Y axis) about the overall center of gravity of the robot 1 was about 0.8 kg·m²/s at maximum. In contrast, as seen in the graph a11 in FIG. 11(a), in the Example, the absolute value of the error of the angular momentum (about the Y axis) about the overall center of gravity of the robot 1 was not greater than 0.003 kg·m²/s at maximum.

It is thus apparent that, according to the present embodiment in which the motional state of the robot 1 shifted from the one defined by the current desired gait toward the one expected in the future is used as the motional state of the starting point of the robot 1 for calculating the Jacobian matrix A, it is possible to generate a desired gait that can track the desired control object vector ↑S_cmd with higher accuracy than in the case where the motional state defined by the current desired gait is used as the motional state of the starting point of the robot 1 for calculating the Jacobian matrix A.

Second Embodiment

A second embodiment of the present invention will now be described with reference to FIG. 12. The second embodiment is different from the above-described first embodiment only in part of the processing in the desired body motion velocity value determiner 45. Therefore, in the description of the present embodiment, the differences from the first embodiment will be described primarily; the description of the same features as in the first embodiment will not be repeated.

The present embodiment differs from the first embodiment only in the processing of determining ↑ωleg_i_min and ↑ωleg_i_max in the aforesaid linear matrix inequalities (10a) and (10b).

Figure 12:
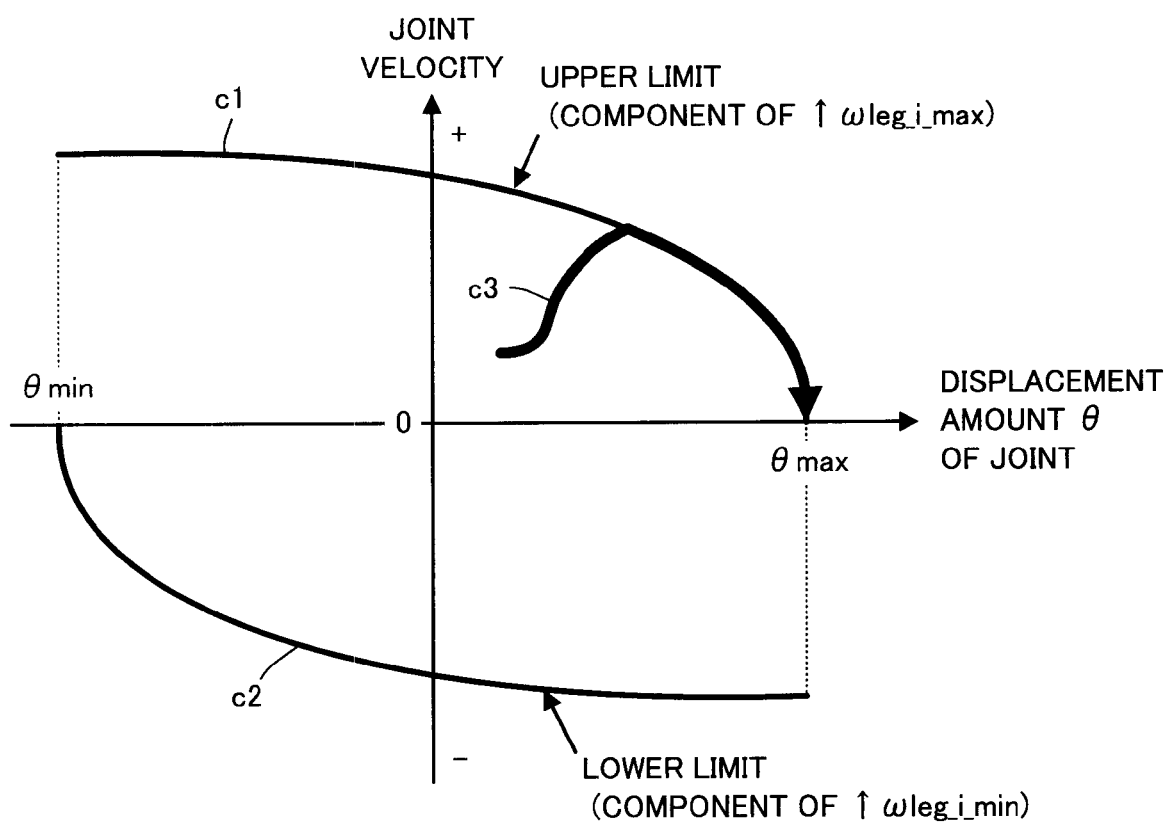
FIG. 12 is a graph illustrating the processing of setting upper and lower limits of the permissible range of the joint velocity in the second embodiment, among the processing in the desired body motion velocity value determiner shown in FIG. 3.

More specifically, in the present embodiment, the desired body motion velocity value determiner 45 determines the components of ↑ωleg_i_min and ↑ωleg_i_max for a leg link 3_i (3R or 3L), i.e. the upper and lower limits of the joint velocity of each joint of the leg link 3_i, in accordance with the displacement amount θ of the joint defined by the latest desired gait (or the last time's value of the desired displacement amount of that joint determined by the desired joint displacement amount determiner 48), as shown in graphs c1 and c2 in FIG. 12.

In this case, the upper and lower limits of the joint velocity of each joint of the leg link 3_i are determined in accordance with the displacement amount θ of that joint, by the following expressions (15a) and (15b), respectively.

Upper limit of joint velocity=√(2·adec·(θmax−θ))  (15a)

Lower limit of joint velocity=−√(2·adec·(θ−θmin))  (15b)

In the above expressions (15a) and (15b), θmax and θmin represent the upper and lower limits, respectively, of the variable range of the displacement amount θ of the joint (the variable range based on the structural restrictions of that joint).

Further, adec is a predetermined acceleration value (which is a positive value in the present embodiment) that is set, in a range of not greater than the maximum value in magnitude of the change acceleration (rotational angular acceleration) of the displacement amount of the joint based on the capability of the joint actuator 30 that drives that joint, such that the value on the right side of the expression (15a) when the displacement amount θ of the joint is made to coincide with θmin becomes not greater than the upper limit ωmax of the variable range of the joint velocity of that joint (the variable range based on the restrictions including the capability of the joint actuator 30), and such that the value on the right side of the expression (15b) when the displacement amount θ of the joint is made to coincide with θmax becomes not less than the lower limit value ωmin of the variable range of the joint velocity of that joint.

For example, the magnitude of this acceleration value adec is set to about a half of the maximum value in magnitude of the change acceleration (rotational angular acceleration) of the displacement amount of the joint. It is noted that the acceleration value adec does not have to be the same for all the joints in each leg link 3.

The present embodiment is identical to the first embodiment except for the points described above.

According to the present embodiment, the upper and lower limits of the joint velocity of each joint in a leg link 3_i are determined in the above-described manner. Therefore, the upper and lower limits of each joint of each leg link 3 are determined such that the displacement amount of that joint falls within the variable range between the upper limit θmax and the lower limit θmin thereof, and such that the joint velocity of that joint falls within the variable range between the upper limit ωmax and the lower limit ωmin thereof, as in the first embodiment.

In addition, according to the present embodiment, in the situation where the displacement amount and joint velocity of each joint of each leg link 3 change along the graph c1 defined by the aforesaid expression (15a), as shown by a trajectory line c3 in FIG. 12, for example, the magnitude of the joint velocity of that joint can be made to change at a constant acceleration value adec.

The same applies to the case where the displacement amount and joint velocity of the joint of the leg link 3 change along the graph c2 defined by the aforesaid expression (15b).

Therefore, it is possible to generate a desired gait that can make the drive force of the joint actuator of each joint kept approximately constant in the situation where the displacement amount and joint velocity of each joint of each leg link 3 change along the graph c1 defined by the above expression (15a) or along the graph c2 defined by the above expression (15b). This leads to the generation of a desired gait that ensures a smooth operation of the robot 1.

A description will now be made of some modifications of the present invention other than the first and second embodiments described above.

In each of the above embodiments, the bipedal mobile robot 1 having two leg links was described as an example. However, the gait generating device of the present invention is also applicable to a legged mobile robot having three or more leg links Further, in each of the above embodiments, the evaluation function f1 in the aforesaid expression (13a) was used as the evaluation function for determining the desired body motion velocity vector ↑Vb_cmd2 by arithmetic processing according to a solution method for a quadratic programming problem. Alternatively, the evaluation function f2 in the aforesaid expression (13b) may be used therefor.

Further, in each of the above embodiments, the linear matrix inequalities representing the body motion velocity restriction condition were set to cause the displacement amounts and joint velocities of the joints in each leg link 3 to fall within the variable ranges thereof. Alternatively, for example in the case of generating a desired gait of the type in which the displacement amounts of the joints in each leg link 3 are unlikely to go beyond the variable ranges thereof, the linear matrix inequalities may be set in consideration of only the variable ranges of the joint velocities of the joints in each leg link 3

In such a case, the linear matrix inequalities of the above expressions (10a) and (10b) may be set such that the value of each component of ↑ωleg_i_min in the linear matrix inequality (10a) coincides with the lower limit of the variable range of the joint velocity of the joint corresponding to that component, and such that the value of each component of ↑ωleg_i_max in the linear matrix inequality (10b) coincides with the upper limit of the variable range of the joint velocity of the joint corresponding to that component.

Furthermore, in the case where each leg link 3 of the robot 1 is a link mechanism having the construction including a gimbal mechanism, for example, it may be necessary, not only to restrict the displacement amounts and joint velocities of the individual joints in each leg link 3 to values within certain ranges, but also to restrict a linear combination value of the displacement amounts of particular joints in the leg link 3 to a value within a certain range. In such a case, a linear matrix inequality for restricting the linear combination value of the displacement amounts of the particular joints in the leg link 3 to a value within a certain range may be included in the linear matrix inequalities representing the body motion velocity restriction condition.

Such a linear matrix inequality for restricting the linear combination value of the displacement amounts of a plurality of joints in a leg link 3 to a value within a certain range can be configured in the following manner.

The linear combination value (hereinafter, denoted by "Φ") of the displacement amounts of the joints in a leg link 3_i is expressed by the following expression (16) by using a vector ↑θleg_i, having the displacement amounts of the respective joints in the leg link 3_i as its components, and a vector ↑a, having coefficients to be multiplied to the displacement amounts of the respective joints as its components. It is noted that the component of ↑a corresponding to a joint other than the aforesaid particular joints may be zero.

$$\Phi = \uparrow a^T \cdot \uparrow \theta\text{leg}\_i \quad (16)$$

Therefore, when the temporal change rate of the linear combination value Φ is denoted by Φd(≡dΦ/dt), the relationship between this Φd and the vector ↑ωleg_i having the joint velocities of the respective joints in the leg link 3_i as its components is given by the following expression (17).

$$\Phi d(\equiv d\Phi/dt) = \uparrow a^T \cdot \omega\text{leg}\_i \quad (17)$$

From this expression (17) and the aforesaid expression (9), the following expression (18) is derived.

$$\Phi d = (\uparrow a^T \cdot C\_i) \cdot \uparrow Vb + (\uparrow a^T \cdot \uparrow c\_i) \quad (18)$$

Therefore, when the upper and lower limits of Φd are set in accordance with the permissible range of the value of the linear combination value Φ, the linear matrix inequality restricting the value of the body motion velocity vector ↑Vb is obtained.

Here, assume that the permissible range of the value of Φ is a range of: Φ≤Φmax (Φmax is the upper limit of Φ), for example. In this case, when the upper limit Φd_max of Φd is set, in accordance with the value of Φ in the latest desired gait, such that the upper limit of Φd is decreased to zero as the value of Φ approaches Φmax, the linear matrix inequality of the following expression (19) which restricts the value of ↑Vb to prevent the value of Φ from exceeding Φmax can be obtained.

$$(\uparrow a^T \cdot C\_i) \cdot \uparrow Vb + ((\uparrow a^T \cdot \uparrow c\_i) - \Phi d\_max) \geq \uparrow 0 \quad (19)$$

It is noted that in the case of restricting the value of Φ to a value not lower than a certain lower limit, a linear matrix inequality for restricting the value of ↑Vb can be obtained in the same manner as described above.

Further, in the above embodiments, as the motional state as the starting point of the robot 1 for calculation of the Jacobian matrix A, the motional state of the robot 1 shifted from the one defined by the current desired gait toward the one expected in the future was used. Alternatively, the motional state defined by the current desired gait may be used as the motional state as the starting point of the robot 1 for calculation of the Jacobian matrix A.

With this configuration as well, according to the embodiment in which the desired body motion velocity vector ↑Vb_cmd2 is restricted by the aforesaid linear matrix inequalities, the desired gait of the robot 1 can be generated while satisfying the joint operation restriction condition for each joint in each leg link 3

Particularly in the case where the arithmetic processing cycle of the gait generator 32 can be set sufficiently short in time, even when the relationship between the position and posture of the body 2 and the integral of the control object vector ↑S is nonlinear, it is possible to determine an appropriate desired body motion velocity vector ↑Vb_cmd2 corresponding to the aforesaid desired control object vector ↑S_cmd, by carrying out the processing similar to that in each of the above embodiments, by using the Jacobian matrix A obtained by setting the motional state defined by the current desired gait as the starting point.

Further, the robot 1 in each of the above embodiments has the joint 12 in the body 2. Alternatively, the robot may have the lower body 10 and the upper body 11 of the robot 2 configured as one piece. In this case, the basic desired body motion velocity vector ↑Vb_cmd1 and the desired body motion velocity vector ↑Vb_cmd2 may each be configured with a six-component vector, with the component of the displacement amount of the joint 12 excluded. In this case, the third column of the matrix B_i in the aforesaid expression (8) is unnecessary.

Still alternatively, the robot may be provided with a joint having two or more degrees of freedom (the joint rotatable about two or more axes) between the lower body 10 and the upper body 11. In this case, the basic desired body motion velocity vector ↑Vb_cmd1 and the desired body motion velocity vector ↑Vb_cmd2 may each be configured with the components of the temporal change rates of the position and posture of the lower body 10 and the components of the temporal change rates of the displacement amounts in the respective axis directions of the joint between the lower body 10 and the upper body 11.

Further, each leg link 3 of the robot 1 in each of the above embodiments is a link mechanism with six degrees of freedom. Alternatively, each leg link may be a link mechanism having seven or more degrees of freedom. In this case, the matrix C_i in the aforesaid linear matrix inequality (10a), (10b), or (19) may be calculated by using an expression obtained by replacing $(Jleg\_i)^{-1}$ on the right side of the aforesaid expression (9a) with a pseudo inverse matrix of the Jacobian matrix Jleg_i (for example, the pseudo inverse matrix such as singularity robust inverse (SR-Inverse)).

Further, regarding the operational target generating device of the present invention, the robot as an object thereof is not limited to the legged mobile robot like the aforesaid robot 1; it may be a stationary work robot. Still alternatively, the robot may be a mobile work robot provided with a wheel or crawler as means for movement.

Furthermore, the operational target generating device of the present invention may be applied for example to the case of generating an operational target for an arm link extended from the body of a robot.

What is claimed is:
1. A gait generating device for a legged mobile robot which travels by motions of a plurality of leg links extended from a body, each leg link having a plurality of joints, the gait generating device sequentially generating a desired gait defining displacement amounts of the respective joints of the mobile robot, the gait generating device comprising:
a desired leg position/posture determining unit that sequentially determines a desired leg position/posture as a constituent element of the desired gait, the desired leg position/posture being desired values of the position and posture of a distal portion of each leg link of the mobile robot;
a desired control object vector determining unit that sequentially determines a desired control object vector as a desired value of a control object vector, the control object vector being expressed as a vector obtained by linearly mapping a particular-site motion velocity vector having, as its components, change amounts per unit time of the position and posture of a particular site, the particular site being either the body of the mobile robot or a site other than the plurality of leg links that is connected to the body;
a Jacobian matrix determining unit that sequentially determines a Jacobian matrix representing the linear mapping by using at least a latest desired gait among the already determined desired gaits of the mobile robot;
a desired particular-site motion velocity value determining unit that uses a predetermined quadratic evaluation function, having the particular-site motion velocity vector as a variable and configured to yield a value varying in accordance with at least a difference between the determined desired control object vector and a vector obtained by multiplying the particular-site motion velocity vector by the determined Jacobian matrix, wherein the desired particular-site motion velocity value determining unit also uses at least one linear matrix inequality having the particular-site motion velocity vector as a variable, to sequentially calculate a value of the particular-site motion velocity vector that can minimize the value of the evaluation function within a range in which a restriction condition that the linear matrix inequality holds is satisfied, by arithmetic processing according to a solution method for a quadratic planning problem, and to sequentially determine the calculated value of the particular-site motion velocity vector as a desired value of the particular-site motion velocity vector; and
a desired particular-site position/posture determining unit that sequentially integrates the determined desired values of the particular-site motion velocity vector to sequentially determine a desired particular-site position/posture as a constituent element of the desired gait, the desired particular-site position/posture being desired values of the position and posture of the particular site, wherein the linear matrix inequality used by the desired particular-site motion velocity value determining unit in the arithmetic processing according to the solution method for the quadratic programming problem being set to satisfy a joint operation restriction condition that restricts, for each of the joints between the particular site and the distal portion of the corresponding leg link, a value of at least one of a displacement amount of the joint and a joint velocity as a temporal change rate thereof.

2. The gait generating device for a legged mobile robot according to claim 1, wherein the joint operation restriction condition includes at least a condition that the value of the joint velocity of each of the joints between the particular site and the distal portion of the corresponding leg link falls within a predetermined variable range thereof, the linear matrix inequality used by the desired particular-site motion velocity value determining unit in the arithmetic processing according to the solution method for the quadratic programming problem includes two linear matrix inequalities expressed by the following expressions (100a) and (100b) for each of the leg links, and $\uparrow \omega\_i\_min$ in the following expression (100a) is set such that a value of each component of $\uparrow \omega\_i\_min$ takes a value not smaller than a lower limit of the variable range of the joint velocity of the joint corresponding to that component among the joints between the particular site and the distal portion of the corresponding leg link, and $\uparrow \omega\_i\_max$ in the following expression (100b) is set such that a value of each component of $\uparrow \omega\_i\_max$ takes a value not greater than an upper limit of the variable range of the joint velocity of the joint corresponding to that component among the joints between the particular site and the distal portion of the corresponding leg link;

wherein expressions (100a) and (100b) are defined by:

$$C\_i \cdot \uparrow Vs + (\uparrow c\_i - \uparrow \omega\_i\_min) \geq \uparrow 0 \quad (100a)$$

$$-C\_i \cdot \uparrow Vs + (-\uparrow c\_i + \uparrow \omega\_i\_max) \geq \uparrow 0 \quad (100b)$$

where the suffix i: identification number of a leg link, $C\_i$: matrix defined by $C\_i \equiv -(J\_i)^{-1} \cdot B\_i$, $\uparrow c\_i$: vector defined by $\uparrow c\_i \equiv (J\_i)^{-1} \cdot \uparrow Vft\_i$, $(J\_i)^{-1}$: inverse matrix or pseudo inverse matrix of $J\_i$, $J\_i$: Jacobian matrix representing linear mapping from $\uparrow \omega\_i$ to $\uparrow Vft\_i$, $\uparrow \omega\_i$: vector having, as its components, joint velocities of the respective joints present between the particular site and the distal portion of the i-th leg link, $\uparrow Vft\_i$: vector having, as its components, a temporal change rate of the position of the distal portion of the i-th leg link and a temporal change rate of the posture of the distal portion, $B\_i$: matrix representing linear mapping from $\uparrow Vs$ to $\uparrow Vft\_i$, $\uparrow Vs$: the particular-site motion velocity vector, $\uparrow \omega\_i\_min$: vector composed of lower limits of permissible ranges of the respective components of $\uparrow \omega\_i$, $\uparrow \omega\_i\_max$: vector composed of upper limits of the permissible ranges of the respective components of $\uparrow \omega\_i$, and $\uparrow 0$: null vector.

3. The gait generating device for a legged mobile robot according to claim 2, wherein the joint operation restriction condition further includes a condition that the value of the displacement amount of each of the joints between the particular site and the distal portion of the corresponding leg link falls within a predetermined variable range thereof, and the desired particular-site motion velocity value determining unit includes a unit for setting $\uparrow \omega\_i\_min$ in the above expression (100a), in accordance with latest desired joint displacement amounts which are the displacement amounts of the joints defined by the latest desired gait, such that the value of each component of $\uparrow \omega\_i\_min$ takes a value not smaller than the lower limit of the variable range of the joint velocity of the joint corresponding to that component among the joints between the particular site and the distal portion of the corresponding leg link and such that as the latest desired joint displacement amount of the joint approaches a lower limit of the variable range of the displacement amount of the joint, the value of the component of $\uparrow \omega\_i\_min$ corresponding to the joint decreases to approach zero, and a unit for setting $\uparrow \omega\_i\_max$ in the above expression (100b), in accordance with the latest desired joint displacement amounts, such that the value of each component of $\uparrow \omega\_i\_max$ takes a value not greater than the upper limit of the variable range of the joint velocity of the joint corresponding to that component among the joints between the particular site and the distal portion of the corresponding leg link and such that as the latest desired joint displacement amount of the joint approaches an upper limit of the variable range of the displacement amount of the joint, the value of the component of $\uparrow \omega\_i\_max$ corresponding to the joint decreases to approach zero.

4. The gait generating device for a legged mobile robot according to claim 1, further comprising:

a basic desired operation value determining unit that uses a dynamic model representing dynamics of the mobile robot and the determined desired leg position/posture to sequentially determine a basic desired body position/posture as basic desired values of the position and posture of the body of the mobile robot, a basic desired overall center of gravity as a basic desired value of the position of the overall center of gravity of the mobile robot, a basic desired translational momentum vector as a basic desired value of a translational momentum vector of the overall center of gravity of the mobile robot, and a basic desired angular momentum vector as a basic desired value of an angular momentum vector about the overall center of gravity of the mobile robot, such that a dynamic restriction condition for the mobile robot to perform motion is satisfied on the dynamic model;

a desired-gait center-of-gravity calculating unit that sequentially calculates a desired-gait overall center of gravity from the desired gait, on the basis of a geometric model of the mobile robot, the desired-gait overall center of gravity being a position of the overall center of gravity of the mobile robot corresponding to the desired gait having the determined desired leg position/posture and the determined desired body position/posture as constituent elements thereof;

a basic desired translational momentum correcting unit that sequentially determines a corrected basic desired translational momentum vector by correcting the determined basic desired translational momentum vector by a feedback manipulated variable, the feedback manipulated variable being determined in accordance with a deviation between the calculated desired-gait overall center of gravity and the determined basic desired overall center of gravity so as to cause the desired-gait overall center of gravity to track the basic desired overall center of gravity; and a basic desired body motion velocity determining unit that uses as the particular-site motion velocity vector a vector having as its components the change amounts per unit time of the position and posture of the body as the particular site, to sequentially determine a basic desired body motion velocity vector as a basic desired value of the particular-site motion velocity vector, in accordance with a deviation between the determined desired body position/posture and the determined basic desired body position/posture, so as to cause the desired body position/posture to track the basic desired body position/posture, wherein the control object vector is a vector comprising the components of the particular-site motion velocity vector, the components of the translational momentum vector of the overall center of gravity of the mobile robot, and the components of the angular momentum vector about the overall center of gravity of the mobile robot, and the desired control object vector determining unit determines a vector comprising the components of the determined basic desired body motion velocity vector, the components of the determined corrected basic desired translational momentum vector, and the components of the determined basic desired angular momentum vector, as the desired control object vector.

5. The gait generating device for a legged mobile robot according to claim 1, wherein when newly determining the Jacobian matrix representing the linear mapping from the particular-site motion velocity vector to the control object vector, the Jacobian matrix determining unit estimates, on the basis of the latest desired gait and at least one past desired gait immediately preceding the latest desired gait, an instantaneous value of a future gait of the mobile robot within a period between a time corresponding to the latest desired gait among the already determined desired gaits of the mobile robot and a time corresponding to a new desired gait having as its constituent element a desired particular-site position/posture determined by the desired particular-site position/posture determining unit in accordance with a new desired value of the particular-site motion velocity vector, and the Jacobian matrix determining unit uses the estimated instantaneous value of the future gait as a motional state of the mobile robot at a starting point of the changes of the position and posture of the particular site by the particular-site motion velocity vector, to determine the Jacobian matrix corresponding to the motional state of the starting point of the mobile robot.

6. The gait generating device for a legged mobile robot according to claim 5, wherein the desired particular-site motion velocity value determining unit includes a unit that estimates a future instantaneous value of the desired particular-site position/posture by adding to the desired particular-site position/posture in the latest desired gait a correction amount obtained by multiplying a difference between the desired particular-site position/posture in the latest desired gait and the desired particular-site position/posture in the past desired gait immediately preceding the latest desired gait by a coefficient Kp predetermined within a range between "0" and "1", and a unit that estimates, for each leg link, a future instantaneous value of the desired leg position/posture of the leg link by adding to the desired leg position/posture in the latest desired gait a correction amount obtained by multiplying a difference between the desired leg position/posture in the latest desired gait and the desired leg position/posture in the past desired gait immediately preceding the latest desired gait by the coefficient Kp, and the desired particular-site motion velocity value determining unit uses a gait having as its constituent elements the estimated future instantaneous value of the desired particular-site position/posture and the estimated future instantaneous value of the desired leg position/posture of each leg link as the motional state of the starting point of the mobile robot.

7. An operational target generating device for a robot having a particular site and a link mechanism extended from the particular site, the particular site having its spatial position and posture movable, the link mechanism having a plurality of joints, the operational target generating device sequentially generating an operational target defining displacement amounts of the respective joints of the robot, the operational target generating device comprising:

a desired link-mechanism distal-portion position/posture determining unit that sequentially determines a desired link-mechanism distal-portion position/posture as a constituent element of the operational target, the desired link-mechanism distal-portion position/posture being desired values of the position and posture of a distal portion of the link mechanism;

a desired control object vector determining unit that sequentially determines a desired control object vector as a desired value of a control object vector, the control object vector being expressed as a vector obtained by linearly mapping a particular-site motion velocity vector having, as its components, change amounts per unit time of the position and posture of the particular site of the robot;

a Jacobian matrix determining unit that sequentially determines a Jacobian matrix representing the linear mapping by using at least a latest operational target among the already determined operational targets of the robot;

a desired particular-site motion velocity value determining unit that uses a predetermined quadratic evaluation function, having the particular-site motion velocity vector as a variable and configured to yield a value varying in accordance with at least a difference between the determined desired control object vector and a vector obtained by multiplying the particular-site motion velocity vector by the determined Jacobian matrix, wherein the desired particular-site motion velocity value determining unit also uses at least one linear matrix inequality having the particular-site motion velocity vector as a variable, to sequentially calculate a value of the particular-site motion velocity vector that can minimize the value of the evaluation function within a range in which a restriction condition that the linear matrix inequality holds is satisfied, by arithmetic processing according to a solution method for a quadratic planning problem, and to sequentially determine the calculated value of the particular-site motion velocity vector as a desired value of the particular-site motion velocity vector; and a desired particular-site position/posture determining unit that sequentially integrates the determined desired values of the particular-site motion velocity vector to sequentially determine a desired particular-site position/posture as a constituent element of the operational target, the desired particular-site position/posture being desired values of the position and posture of the particular site, the linear matrix inequality used by the desired particular-site motion velocity value determining unit in the arithmetic processing according to the solution method for the quadratic programming problem being set to satisfy a joint operation restriction condition that restricts, for each of the joints between the particular site and the distal portion of the link mechanism, a value of at least one of a displacement amount of the joint and a joint velocity as a temporal change rate thereof.

* * * * *